United States Patent
Dorfman

(10) Patent No.: US 11,260,545 B2
(45) Date of Patent: Mar. 1, 2022

(54) ROBOTS WITH DYNAMICALLY CONTROLLED POSITION OF CENTER OF MASS

(71) Applicant: Benjamin F. Dorfman, San Francisco, CA (US)

(72) Inventor: Benjamin F. Dorfman, San Francisco, CA (US)

(*) Notice: Subject to any disclaimer, the term of this patent is extended or adjusted under 35 U.S.C. 154(b) by 0 days.

(21) Appl. No.: 17/064,894

(22) Filed: Oct. 7, 2020

(65) Prior Publication Data

US 2021/0069918 A1 Mar. 11, 2021

Related U.S. Application Data

(62) Division of application No. 16/005,109, filed on Jun. 11, 2018, now abandoned.

(Continued)

(51) Int. Cl.
*B25J 5/00* (2006.01)
*B25J 19/00* (2006.01)
(Continued)

(52) U.S. Cl.
CPC ......... *B25J 19/0012* (2013.01); *B25J 9/0009* (2013.01); *B25J 19/002* (2013.01);
(Continued)

(58) Field of Classification Search
CPC .. B62D 57/032; B62D 57/022; B62D 57/028; B62D 37/04; B62D 49/08; B62D 49/085;
(Continued)

(56) References Cited

U.S. PATENT DOCUMENTS 3,255,812 A * 6/1966 Bayane ............... A47J 39/02
165/265
3,605,633 A * 9/1971 Townsend ............... B61D 3/16
105/1.4

(Continued)

FOREIGN PATENT DOCUMENTS

DE 20314213 * 11/2003 .......... B25J 19/0008
WO WO-2007057904 A1 * 5/2007 .............. B25J 5/005

OTHER PUBLICATIONS

Translation of DE 20314213 to Ebisch (Year: 2003).*

*Primary Examiner* — Anne Marie M Boehler
(74) *Attorney, Agent, or Firm* — Nixon Peabody LLP

(57) ABSTRACT

Dynamic control of a center of mass position is based on replacement of discrete motion of macro body (counterweighing solid or counterbalancing mechanisms) for continuous molecular flow of counterweighing liquid. Redistributing liquid counterweight between chambers attached to independently moving parts of robot allows its motion to new stable position without disruption in static stability and dynamic balance. Various embodiments include bipods/humanoids, wheeled locomotion robots and hybrid wheeled/multi-pod bio-like robotic systems; some embodiments allow reversible mutual reconfiguration between various structural arrangements. In humanoid embodiments, method allows moving on uneven terrain or ascending staircases while maintaining static stability; method also decreases the probability of fall and secures self-rising if a fall occurred. In some embodiments liquid counterweight may be transferred upon high barriers exceeding the height of robot by a few folds, such as walls of the building or ledge or steep slope in mountains, thus providing robots with capability principally not available to prior art.

2 Claims, 26 Drawing Sheets

Related U.S. Application Data

(60) Provisional application No. 62/517,870, filed on Jun. 10, 2017.

(51) Int. Cl.

| | | |
|---|---|---|
| *B62D 57/032* | (2006.01) | |
| *B62D 37/04* | (2006.01) | |
| *B62D 49/08* | (2006.01) | |
| *B25J 9/00* | (2006.01) | |
| *G05D 1/08* | (2006.01) | |
| *G06F 21/00* | (2013.01) | |
| *G06N 3/04* | (2006.01) | |
| *H04L 29/06* | (2006.01) | |
| *G06N 3/02* | (2006.01) | |

(52) U.S. Cl.
CPC ........ *B25J 19/0008* (2013.01); *B62D 57/032* (2013.01); *G05D 1/0891* (2013.01); *G06F 21/00* (2013.01); *G06N 3/04* (2013.01); *H04L 63/029* (2013.01); *H04L 63/0281* (2013.01); *G05B 2219/40298* (2013.01); *G05B 2219/40465* (2013.01); *G06N 3/02* (2013.01)

(58) Field of Classification Search
CPC ............... B62D 55/075; B62D 55/0655; B25J 19/0012; B25J 19/0008; B25J 19/002; B25J 5/007; B25J 5/005
USPC ..... 180/24.02, 24.06, 24.07, 9.32, 9.4, 9.42, 180/76, 14.1, 14.2, 8.5, 8.3, 901; 280/5.2, 5.28, 5.3, 755, 482; 254/93 H, 254/DIG. 9
See application file for complete search history.

(56) References Cited

U.S. PATENT DOCUMENTS

| | | | | |
|---|---|---|---|---|
| 4,032,016 | A * | 6/1977 | Graf | B66C 23/74 212/196 |
| 4,565,487 | A * | 1/1986 | Kroczynski | B62D 57/02 180/8.6 |
| 4,683,773 | A * | 8/1987 | Diamond | B25J 9/00 446/383 |
| 5,284,096 | A * | 2/1994 | Pelrine | B62D 49/04 104/138.2 |
| 6,409,186 | B2 * | 6/2002 | Bennington | B60P 3/0257 280/43.23 |
| 9,403,566 | B2 * | 8/2016 | Jacobsen | B62D 55/0655 |
| 2003/0127259 | A1 * | 7/2003 | Logstrup | B62B 5/02 180/23 |
| 2006/0151218 | A1 * | 7/2006 | Goren | B62D 61/12 180/24.02 |
| 2006/0243499 | A1 * | 11/2006 | Hosoda | B62D 57/028 180/8.5 |
| 2007/0039768 | A1 * | 2/2007 | Hacikadiroglu | B25J 19/0008 180/76 |
| 2015/0101873 | A1 * | 4/2015 | Schlee | B25J 9/06 180/167 |
| 2015/0226369 | A1 * | 8/2015 | Troy | B66C 13/48 180/2.1 |
| 2020/0038273 | A1 * | 2/2020 | Rubaek | B25J 13/085 |

* cited by examiner

12a

12b 12c  12d  12e

13a

13b

13c

13d

13e

13f

13g

ROBOTS WITH DYNAMICALLY CONTROLLED POSITION OF CENTER OF MASS

CROSS-REFERENCE TO RELATED APPLICATIONS

This application claims the benefit of U.S. Provisional Patent Application Ser. No. 62/517,870, filed Jun. 10, 2017, which is incorporated herein by reference in its entirety.

FIELD OF THE INVENTION

The present invention generally pertains to maneuverability, stability and dynamic balance of robots, in particular, to robots having extended capabilities for autonomous movement upon strongly uneven ground, including ruins and mountains, and in dangerous environments. Specifically, the present invention is aimed at methods and apparatuses providing dynamically controllable position of center of mass for legged and wheeled locomotion robots.

DESCRIPTION OF THE RELATED ART

Counterbalancing subsystems are the important parts of the entire robotic mechanical systems. Thus, significant efforts focused in the advancing of the counterbalancing subsystems of robots, and various passive and active approaches had been developed:

Specially introduced counterweight—the examples are disclosed in the U.S. Pat. Nos. 2,344,108; 3,543,989; 4,402,646:

Permanently-low positioning of Center of Mass of the functional robotic structure—the examples are disclosed in the U.S. patent disclosures of the human transporter devices that balance on two wheels U.S. Pat. Nos. 5,701,965 and 6,302,230.

Counterbalancing pressure—pneumatic or hydraulic mechanisms—the examples are disclosed in the U.S. Pat. Nos. 3,370,452, 4,300,198, 4,229,136 and 4,751,868.

Mechanical spring-based counterbalancing—the examples are disclosed in the U.S. Pat. Nos. 3,391,804; 4,024,961; 4,259,876; 4,283,165, and 4,378,959.

Electromechanical counterbalancing devices—the example is disclosed in the U.S. patent application No. US 2014/0246258.

The cited examples indicate multidirectional approaches to the counterbalancing subsystem design; however, mechanical counterbalancing methods and apparatuses face double limitations—they are specified to particular configurations of the arms or body of the robots and strictly limit the height of barriers which the locomotion robot is able to overcome. To expand the robots' abilities, both fluid mechanical systems and solid mechanical systems with extended capabilities had been disclosed.

Thus, the U.S. Pat. No. 4,751,868 describes a method and system employing double-acting, fluid-driven, twistor-pairs as combined flexural supports, joints, torque motors and linear-response angular deflectors in arms and legs of arthrobots. Controllable variation of the fluid pressures of gas (usually pressurized air) in two elastic shells causes the joint to move into predetermined predictable angular positions, as a linear function of the fluid pressure values. The term "arthrobots" in this disclosure is used to place equal emphasis upon robots having jointed arms for manipulating objects and upon robots having multiple jointed legs for self-propelled locomotion. A six-legged, insect-like, self-propelled, walking robot ("hexapodal arthrobot") achieves locomotion with three legs always on the ground, providing advantageous, stable tripod support, by programming fluid pressures in twistor-pairs of respective joints varying in predetermined sequences. Costly friction-producing bearings are eliminated at joints and by eliminating bearings, mass, weight and inertia are substantially reduced, and frictional and torque drag effects are nearly eliminated. These benefits result with significant improvements in static and dynamic performance of arthrobots, reduce costs of manufacture and may be employed for various industrial applications and for toys. However, it does not address the problem of dynamic balance of locomotion robots and it is limited with arthrobots.

The U.S. Pat. No. 8,316,972 discloses a dynamically controlled active mechanical systems an apparatus and a method for robotic control that allows an unbalanced pendulum robot to raise its Center of Mass and balance on two motorized wheels. The robot includes a pair of arms that are connected to the upper body of the robot through motorized joints. The method consists of a series of movements employing the arms of the robot to raise the robot to the upright position. The robot is first configured as a low Center of Mass four-wheeled vehicle, then its Center of Mass is raised using a combination of its wheels and the joint located at the attachment point of the arm apparatus and the robot body, between the rear and front wheels; the method then applies accelerations to the rear wheels to dynamically pivot and further raise the Center of Mass up and over the main drive wheels bringing the robot into a balancing pendulum configuration.

It is apparent from the cited examples that the various methods and mechanisms known from the prior arts provide effective approaches to the counterbalancing problem in the numerous specific tasks; however, they imply the increase of complexity in design, structure and control of robotic systems, while the stability and safety requirements still necessitate the further improvements; these problems are particularly strong in the complex environment thus limiting the scope of available practical tasks in robot implementation. Furthermore, the fall of a robot during maneuvers is frequently occurring. On one hand, it represents the manifold dangers for completion of a responsible tasks, for humans in the proximity and for the robot itself. On the other hand, rising the robot back represents a complex and not always solvable task for remote operators. The self-rising (also termed as self-righting) of robots based on passive approaches, specific mechanisms, overturned drivability, and dynamic approaches known from the prior arts didn't not resolve the problem.

The U.S. Pat. No. 8,977,485 B2 disclosed methods for robotic self-righting from an overturned state to its nominal upright configuration including defining a convex hull and center of mass of each link of the robot; determining the convex hull and overall robot center of mass for each joint configuration of the robot; analyzing each convex hull face to determine its stability or instability; grouping continuously stable orientations of the robot and joint configurations together defining nodes and transitions there between; assigning a cost to transitions between nodes; computing an overall cost for each otential set of transition costs resulting in achievement of the goal; and determining a sequence of one or more actions to self-right the robot such that the sequence of actions minimizes the overall cost of self-righting the robot.

Although counterbalancing and self-rising may be considered as secondary functions supporting the primary useful functionality of the robots, they substantially defines maneuverability, stability and dynamic balance of robots, their safety and the scope of the practically useful functions achievable at the given general state of robotic science and technology. Moreover, counterbalancing and self-rising significantly contributes into the manifold complexity of robotic mechanics, including mathematical apparatus and control systems, design and structures. Such growing complexity represents the major hurdle limiting the pace of progress in the field. The objectives of the present invention are relatively simple dynamically controlled counterbalancing methods and apparatuses with the higher levels of reliability and safety predominantly targeting the humanitarian tasks wherein the safety of operation and availability of the aimed complicated localities possess a higher priority than the speed of the motion.

Another objectives of the present invention are dynamically controlled counterbalancing methods and apparatuses extending the scope of available tasks into the hardly available or not available yet fields wherein the human life is endangered, such as rescue works in fire, in the ruins after natural or human-made disaster, or in the harmful industrial productions, or in the mining and geological explorations.

Also objectives of the present invention are relatively simple self-rising methods and devices consistent with the disclosed counterbalancing system of a robot.

SUMMARY OF THE INVENTION

The present invention comprises a robotic apparatus and methods that allow to dynamically control position of its Center of Mass (COM) and to maintain the balance during movement of a locomotion robot upon uneven terrains.

More specifically, it is aimed at legged and/or wheeled locomotion robots with dynamically controllable position of center of mass significantly decoupled from the momentary configuration of the structure of the robot during its movement.

One of principle embodiments of present invention is a capability of the robot to shift its COM to new designated position while the structure of the robot remains immovable.

Another principle embodiment of present invention is a capability of the robot to maintain its COM at the lowest possible position during a motion on an uneven terrain.

Other principle embodiment of present invention is ability of the robot for altitudinal elevating position of its Center of Mass above the supporting ground significantly higher, in some embodiments—in a few folds higher than the normal height of the robot itself thus allowing ascending the steep barriers or vertical walls in urban environment or during a self-mountaineering.

The key physical principle underlying the present invention is the replacement of the discrete motion of macro body, such as counterweighing solid load or counterbalancing rigid mechanisms, for continuous microscopic/molecular flow of liquid counterweight. The robot includes a liquid counterweight, at least one pump, and at least two independently moving parts of the body, each comprises at least one liquid chamber.

The method consists of redistributing of liquid counterweight between the liquid chambers amassing the major portion of the liquid counterweight in the liquid chamber located in the part of the robot resting on stable support while partially or completely emptying the liquid chamber located in the other part of the robot thus maintaining the Center of Mass (CoM) of the robot in the margin of stable support and allowing motion of the other movable part of the robot to a new stable position while reliably retaining the dynamic balance; the method then applies to transfer the liquid counterweight and amass it in the other part; such operations repeated alternatively; a series of such alternating operations allows to move the robot over uneven terrain or to raise the robot uphill or upstairs while continuously maintaining its dynamic balance and stability of its proper position in space.

Method allows various embodiments including legged, wheeled and reconfigurable locomotion robots. Some embodiments of the disclosed method and apparatuses may comprise a plurality of movable parts, each part contains its liquid chamber or chambers.

The disclosed method and apparatuses also imply the embodiments with structurally reconfigurable robots allowing reversible mutual transforming between various arrangements.

Another important aspect of this invention is due to the fact that the adaptive redistribution of the internal liquid mass in an autonomously moving system actually approaches one of the basic mechanical principles underlying the dynamics of natural organisms.

Accordingly to the present invention, the liquid chambers of robots may be rigid or flexible or combine both.

Also accordingly to the present invention, the liquid counterweight, depending on specific designation, kind and dimension of the robots, may be lightweight, as water or oil, medium heavyweight, as bromoform, heavyweight, as liquid gallium, or ultra-heavyweight, as mercury.

The same liquid, in particularly oil, may be also employed in hydraulic power transmission systems driving or reconfiguring the robots.

The present invention provides the following advantages to locomotion robots design and functionality:

1. Replacement of motion of macroscopic solid counterweighing bodies for a microscopic continuous molecular flow of liquid counterweight brings multifaceted benefits to the robot mechanics and virtually decouples the COM position from the robot's motion and momentary configuration.
2. Substantial decoupling of COM position from the robot's motion allows significant simplifications in the mathematical model of the robot's dynamics and its control and design.
3. It allows motion of the robot under condition of continuous static stability keeping its safely to the pathway even on strongly uneven terrains, such as ruins, or in mountains or while rising upstairs.
4. In spite the liquid counterweight increases the general mass of robot, it allows avoiding certain relatively heavy and complex structural components.
5. Replacement of mechanical counterbalance for liquid counterweight also decreases vibrations, thus additionally simplifying the dumping system and supporting smooth motion of the robot.
6. The liquid counterweight allows continuous maintaining the lowest possible position of COM thus significantly decreasing possibility of the fall.
7. If a fall occurred, the flexible liquid jackets cushion a shock thus protecting the robot structure and sensitive apparatuses; then, the liquid may be redistributed effectively supporting self-rising of the robot. The same or complimentary flexible jackets may be employed as inflated air pillow elevating the body of robot to position, from which its final self-rising may be relatively easy completed.

8. In some embodiment of the present invention, the liquid counterweight may be transferred upstairs, or uphill, or on the sharp high barrier substantially exceeding the height of the robot even by several folds, such as wall of the building or ledge or steep slope in mountains, thus providing robots with capability which in principle not available for robots designed based on the prior art.

9. The adaptive redistribution of the internal liquid mass in an autonomously moving system actually approaches one of the basic mechanical principles underlying the dynamics of natural organisms.

The disclosed transferable liquid counterbalancing methods method and apparatuses also imply the embodiments with such structurally reconfigurable robots as hybrid manned-robotic systems, bio-like multi-pod robotic devices as caterpillar or spider and also allows reversible mutual transforming between various bio-like arrangements practically beneficially actualizing real and imaginative bioforms, such as centaurs.

According to an embodiment, a locomotion robot with a dynamically controlled center of mass, includes: a liquid counterweight, at least two liquid chambers designated for said liquid counterweight, at least one pump, at least two independently moving parts, each of said at least two independently moving parts including at least one of said at least two liquid chambers, said liquid counterweight being transported and alternatively redistributed between said liquid chambers amassing a major portion of said liquid counterweight at least in one of said at least two liquid chambers located in one of said at least two independently moving parts of said robot while at least partially emptying at least one of an other of said at least two liquid chambers located in others of said at least two independently moving parts of said robot.

According to a further embodiment, a locomotion robot with a dynamically controlled center of mass, said robot includes: a liquid counterweight, at least two liquid chambers designated for said liquid counterweight, at least one pump, at least two independently moving parts, each of said at least two independently moving parts including at least one of said at least two liquid chambers, said liquid counterweight being transported and redistributed between said at least two liquid chambers amassing a major portion of said liquid counterweight in said at least two liquid chambers located in said at least two independently moving parts statically resting on stable support while partially or completely emptying those of said liquid chambers located in others of said at least two independently moving movable parts, one of said at least two independently moving parts with a partially or completely emptied liquid chambers being moved to new position, a series of said transport and redistribution of said liquid counterweight between said liquid chambers being repeated alternatively until the locomotion robot reaches a new designated statically stable position.

According to yet another embodiment, a locomotion robot with a dynamically controlled center of mass, said robot includes: a liquid counterweight, a plurality of independently moving parts, each of at least two of said independently moving parts including at least one liquid chamber and at least one pump, said liquid counterweight being transported and redistributed relative to said at least one liquid chamber amassing a major portion of said liquid counterweight in said at least one liquid chamber being located in said plurality of independently moving parts statically resting on a stable support while partially or completely emptying said at least one liquid chamber located in an other of said plurality of independently moving parts, one of said plurality of independently moving parts having a partially or completely emptied liquid chamber being moved to a new position, the series of said transport and redistribution of liquid counterweight between said liquid chambers repeated alternatively until the locomotion robot reached new designated statically stable position.

According to another embodiment, a locomotion robot having at least two legs, includes: a liquid counterweight, at least two liquid chambers, at least two liquid pumps, each of said at least two legs including at least one of said at least two liquid pumps and at least one of said at least two liquid chambers, said liquid counterweight being transported and redistributed between said at least two liquid chambers amassing a major portion of said liquid counterweight in said at least two liquid chambers located in one of said at least two legs statically resting on a stable support while partially or completely emptying at least one of said at least two liquid chambers located in an other of said at least two legs, one of said at least two legs having a partially or completely emptied liquid chamber of said at least two liquid chambers being moved to a new position, a series of said transport and redistribution of said liquid counterweight between said at least two liquid chambers being repeated alternatively until the locomotion robot reaches a new designated statically stable position. The locomotion robot can further include at least one inflatable airbag on a back of said robot, said robot having a humanoid form, wherein said airbag is normally collapsed, wherein in an occurrence of a fall of said humanoid robot, said airbag is inflated thereby lifting a top of a body of said robot to an upright position. The robot can include at least two hands and a flexible reversibly collapsing liquid chamber attached to at least one of said at least two hands, said flexible reversibly collapsing liquid chamber being filled with a counterweighing liquid controllably shifting a center of mass of said robot during a self-rising or autonomous operation of said robot.

According to a still further embodiment, a locomotion robot, includes: a liquid counterweight, at least two cars each including a tank for said liquid counterweight and a liquid pump, each of said tank being connected by a corresponding flexible pipe for transfer of said liquid counterweight, said liquid counterweight being transported and reversibly redistributed between said tanks.

According to yet a further embodiment, a locomotion robot, includes:

at least two cars, a liquid counterweight, each of at least two cars including a tank for said liquid counterweight and a liquid pump, each of said liquid tanks being connected by a flexible pipe for transfer of said liquid counterweight, said liquid counterweight being transported and reversibly redistributed between chambers of said tanks, said at least two cars being adjacent to one another and joined together by a telescopic hydraulic cylinder, each of at least two cars including a motor or engine.

According to another embodiment, a locomotion robot, includes: a liquid counterweight, at least two cars each including a tank for said liquid counterweight and a liquid pump, each of said tanks being connected by a flexible pipe for transfer of said liquid counterweight, said liquid counterweight being transported and reversibly redistributed between said chambers of said tanks, each of said two cars including a motor or engine, each of said at least two cars having double flexible joints allowing said two cars to alternatively lift each other over a ground surface and mutually change their relative altitudinal positions, one of said double flexible joints having a telescopic hydraulic cylinder fixed with its base on a first of said two cars and with its opposite end of a sliding rod being fixed on a second of said two cars, another of said double flexible joints having a hoister installed on a second of said two cars and with an end of a cable of said hoister being fixed on said first of said two cars, said liquid counterweight being transferred to and amassed in a tank in said first of said two cars resting on the ground surface while emptying said tank in said second car of said two cars, said second car with an emptied tank being lifted by said telescopic hydraulic cylinder up to or slightly above the ground surface at an elevated terrain, the first moving moves a robotic system to a position thereby allowing the second car to be grounded on said elevated terrain, the second car being grounded on said elevated terrain by said telescopic hydraulic cylinder, said liquid counterweight being transferred to and amassed in said tank of the second of said two cars resting on said ground surface on said elevated terrain while emptying said tank in said first car of said two cars, the first car with an emptied tank being lifted by said hoister up to or slightly above of the ground of said elevated terrain, said second car moving the robotic system to a position allowing the first car to be grounded on said elevated terrain, said first car being grounded on said elevated terrain by said hoister such that the robotic system is self-ascended upon said elevated terrain. The locomotion can robot ascend vertical barriers exceeding a normal height of said robot as measured during its resting position or movement on an even terrain.

According to a further embodiment, a locomotion robot with a dynamically controlled center of mass includes: a liquid counterweight, a pump, at least two liquid chambers, said liquid counterweight being transported and alternatively redistributed between said at least liquid chambers, said liquid counterweight including water, oil, bromoform, liquid (melted) gallium or gallium alloys, or mercury.

DETAILED DESCRIPTION OF THE INVENTION

Figure 1:
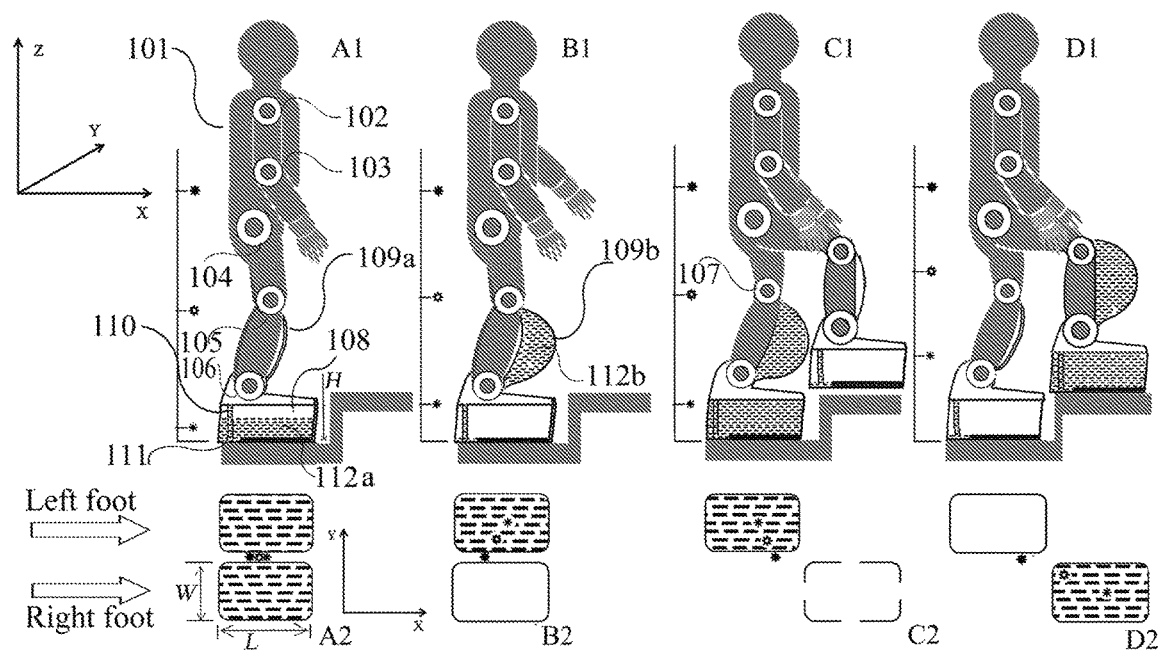
FIG. 1 shows the sequential stages of ascending a single step on a terrain for the Humanoid embodiment of the invention.
Figure 1:
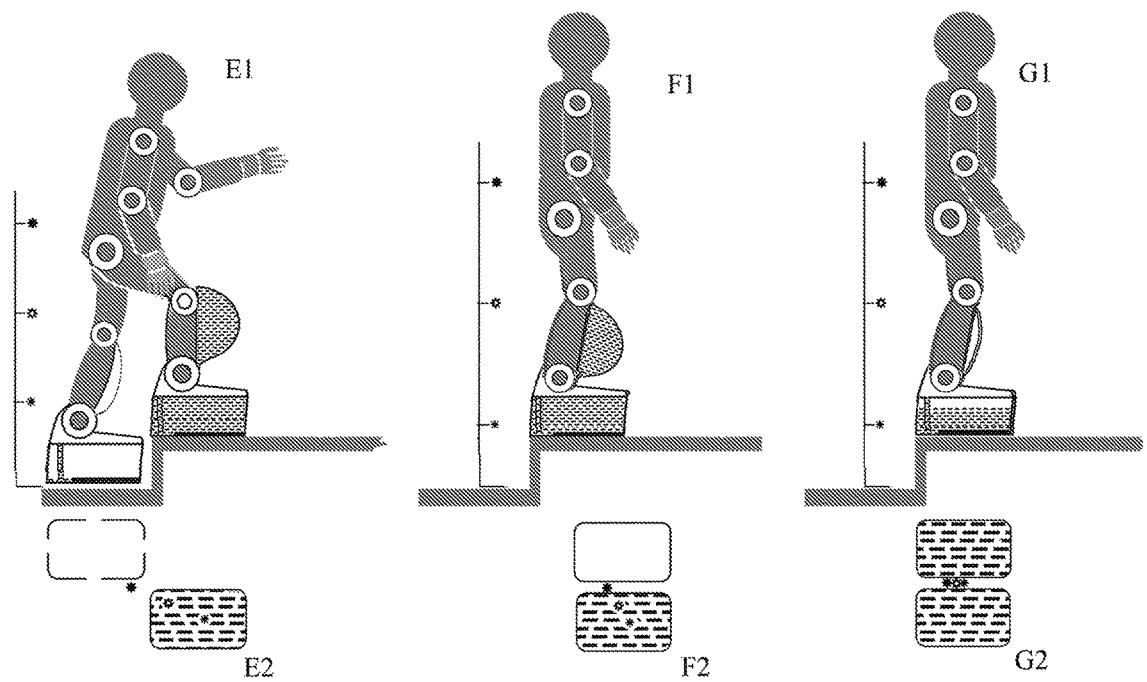

The key concept of present invention is transferable liquid counterweight wherein the transfer of said liquid counterweight substantially or virtually completely decoupled from the motion of the robot's arms and from the motion of its body.

Fixed liquid counterweight is known by prior art, although not in robotic systems, but in industrial cranes. Fixed liquid counterweight provides some convenience during installation or transportation of cranes, but it neither improves, nor extend their useful functionalities.

Partially movable solid counterweight is known by prior art in robotic systems, however a motion of solid counterweight is strictly specified for every particular configuration of a robot's arm and/or its body, and the allowable motion of solid counterweight is narrow limited; besides, it requires additional complex mechanical subsystem and corresponding complex control and supporting mathematical apparatus.

Contrarily to these particularities and limitations of the prior arts, the transferable liquid counterweight brings to robots and robotic systems the following advantages:

1. A change of CoM position is not directly bounded with functional configuration or functional motion of robot; instead, accordingly to the present invention, the dynamically adaptive change of CoM position is achieved by continuous molecular flow of liquid mass that does neither disturb nor restrict the structural body motions and only defined by the requirement of the designated useful task.

2. If required, the necessary change of CoM position may be conducted while the arms and body of robot remain immovable; alternatively, if required, the necessary change of CoM position may be conducted in real time of the robot's motion.

3. Substantial decoupling of COM position from the robot's motion allows significant simplifications in the mathematical model of the robot's dynamics and its control and design. Contrarily to the counterbalancing methods and apparatuses known by prior art wherein the dynamical balance of a robotic system every moment depends on the momentary velocity vector of counterweighing solid body or counterbalancing mechanism and their momentary position and, thus, depends on the trajectory of said solid body or mechanism motion, the trajectory of liquid flow is simply defined by a flexible connecting pipe and does not influence the robotic system dynamic balance.
4. The transferable liquid counterweight allows motion of a humanoid robot under condition of continuous static stability keeping its safely to the pathway even on strongly uneven terrains, such as ruins, or in mountains or while rising upstairs.
5. In spite the liquid counterweight increases the general mass of robot, it allows avoiding certain relatively heavy and complex structural components.
6. Replacement of mechanical counterbalance for the transferable liquid counterweight also decreases vibrations, thus additionally simplifying the dumping system and supporting smooth motion of the robot.
7. The transferable liquid counterweight allows continuous maintaining the lowest possible position of COM thus significantly decreasing possibility of the fall.
8. If a fall occurred, the flexible liquid jackets cushion a shock thus protecting the robot structure and sensitive apparatuses; then, the liquid may be redistributed effectively supporting self-rising of the robot.
9. During the robot's ascending, the transferable liquid counterweight may be lifted upstairs, or uphill, or on the sharp high barrier even greater by several folds than the height of the robot, such as wall of the building or ledge in mountains, thus providing robots with capability not available for robots designed based on the prior art.
10. For humanoids and other bio-like robots, the transferable liquid counterweight represents a significant further approach to the natural balancing mechanisms acting in the live organisms.

The disclosed robot with a transferable liquid counterweight includes at least one pump, and at least two independently moving parts of the body, each comprises at least one liquid chamber.

The method consists of redistributing of liquid counterweight between the liquid chambers amassing the major portion of the liquid counterweight in the liquid chamber located in the part of the robot resting on stable support while partially or completely emptying the liquid chamber located in the other part of the robot thus maintaining the Center of Mass of the robot in the margin of stable support and allowing motion of the other movable part of the robot to new stable position without disruption of the dynamic balance of the robot; the method then applies to transfer the liquid counterweight and amass it in the other part; such operations repeated alternatively; a series of such alternating operations allows to move the robot over uneven terrain or to raise the robot uphill while continuously maintaining its dynamic balance and stability of its proper position in space.

Method allows various embodiments including legged, wheeled and reconfigurable locomotion robots. Some embodiments of the disclosed method and apparatuses may comprise a plurality of movable parts, each part contains its liquid chamber or chambers.

There are variety of liquid pumps known of the prior art, the highly effective miniature pumps are readily available from the industry, and any person of ordinary skill in the pertinent area could make and use the invention without extensive experimentation. The preferable pump depends on specific technical task and may be selected by such person of ordinary skill. Generally, gas-powered liquid transfer pump may be preferred in most implementations of the present invention due to simplicity of the pump and entire liquid transfer system. It is important that gas-powered liquid transfer pumps are functioning from compressed air; thus, the liquid counterweight may be transferred on substantial height practically without limitation.

It is also important, that the liquid transfer pumps are energetically exceptionally effective, and energy effectiveness up to about 98% is practically achievable.

The liquid counterweight, depending on specific designation, kind and dimension of the robots, may be lightweight—as water or oil, medium heavyweight—as bromoform (also known as Tribromomethane, $CHBr_3$; specific gravity 2.89), heavyweight, as liquid gallium, or ultra-heavyweight, as mercury. All these liquid matters are readily available from the industry.

In some embodiments, the same liquid, in particularly oil, may be also employed in hydraulic power transmission systems driving or reconfiguring the robots.

Particular embodiments of the present invention will be clear in specific details from the following examples:

The FIGS. 1-7 show examples of the humanoid robots embodiments of the present invention;

The FIGS. 8-11 show examples of the wheeled robots embodiments of the present invention;

The FIGS. 12-16 show an example of hybrid systems.

The Humanoid Robots Embodiments

Example 1

FIG. 1 shows humanoid robot 101 with joints 102-107 ascending a step. The schematically shown silhouette of a humanoid possesses typical proportions of human (male) body (as defined in "Human Mass Distribution", USAARL, 88-5, here incorporated for reference). The liquid chambers, rigid 108, and flexible 109 (a, b) [109a shows the flexible chamber 109 in deflated stet, 109b shows the flexible chamber 109 in the filled with liquid state], are attached to each leg of robot: the rigid chambers 108 are fixed under the foots, and flexible chambers 109 are attached to the shanks. The pipe 110 (or 'vessel' in bio-like term) is ending in small recession 111 in the bottom of chambers 108, thus a relatively insignificant comparatively to total liquid load 112a, 112b (112a in rigid chambers, 112b in flexible chambers) but functionally important amount of counterweighing liquid always remains in recessions 111 preventing air bubbles formation.

The structural components of the body and mechanisms made of magnesium-lithium alloys with density range 1.4-1.6. Such alloys with reliable protective coatings are known by the prior art and readily available on the industrial market. The magnesium alloys are also known by the prior art as the materials with the superior values of specific stiffness even with comparison with the high quality steel and titanium alloys.

The "bones" of robot are tubular, thus assuring the utmost maximal specific stiffness of the structure. The exterior made of carbon-fiber composites, the elastic chambers made of fiber-reinforced plastics, both kinds of the ultra-light materials known by the prior art. The height of robot in this example (not including the bottom chamber under foot in correspondingly designed robots) is 160 cm. Total structural (solid) mass of robot, not including liquid load, is 50 kg.

Table shows the required volume of different liquids at different relative mass of liquid load vs. body of robot with solid mass 50 kg.

TABLE

| Relative mass of liquid counterweight $M_{liq}/M_{sol} \times 100\%$ | Volume of liquid load, liters for $M_{sol}$ = 50 kg | | |
|---|---|---|---|
| | Tribromomethane (bromoform) 2.89 kg/l | Liquid gallium 6.095 kg/l | Mercury 13.546 kg/l |
| 100 | 17.3 | 8.20 | 3.69 |
| 80 | 13.8 | 6.56 | 2.95 |
| 50 | 8.65 | 4.1 | 1.85 |
| 25 | 4.33 | 2.05 | 0.92 |

In the shown example, internal dimensions of each of the bottom (rigid) chambers 108 are: length L=38 cm, height H=16 cm, width W=22 cm; the corners are slightly rounded, and the actual internal volume 13 liters; maximal liquid mass is 37.57 kg of bromoform in each chamber 108. The actual maximal volume of each flexible chambers 109b 4.3 liters; maximal liquid mass is 12.43 kg of bromoform in each chamber 109b.

The shown example illustrates the maximal liquid load equal to the solid mass of robot, in specific example 50 kg; the liquid counterweight in shown example is the medium heavyweight bromoform (Tribromomethane, $CHBr_3$; specific gravity 2.89).

It is important to note that a smaller relative amounts of liquid load, such as 25% of the solid mass of robot, that is 12.5 kg, will be sufficient for substantial improvement of stability and dynamic balance of robot; however maximal amount of liquid shown on example allows maintaining static stability with substantial margin even during ascending. It is also important to note, that the maximal relative amount of liquid counterweight implies slightly more complex design; the shown examples on FIG. 1 and the following figures illustrating humanoid embodiments of the present invention explain embodiments with the maximal relative amount of medium heavyweight liquid counterweight thus assuring that any person of ordinary skill in the pertinent area could make and use the invention without extensive experimentation even in such relatively complex embodiments, and certainly in the embodiments with lower relative amount and/or greater specific gravity of liquid counterweight—if a person selects such embodiments.

Referring to FIG. 1, images A1, B1, C1, D1, E1, F1, G1 show a sequence of configurations, or phases, which the robot passes through while ascending a singular step between two flat terrains. Positions of Center of Mass (CoM) of the robot's solid structure, as well as CoM of its liquid counterweight and general CoM of the entire robot including liquid counterweight are shown for each phase: specifically, the altitudinal positions of three CoM are shown on Z-axis to the left of each image illustrating corresponding phase, and the ground projections of three CoM relatively to ground projection of the robot's foots shown under image illustrating each phase as images A2, B2, C2, D2, E2, F2, G2 correspondingly; the filling of chambers with liquid indicated by pattern as explained into insert in FIG. 1; ground projection of the suspended foot not touching the ground shown as contour with broken line.

In the initial position of robot, phase A1, at front of the step, the total load of counterweighing liquid is equalized between both legs, and liquid partially filled both rigid chambers 108, while both flexible chambers 109 are emptied and deflated. Ground projections of three CoM are closely positioned between the foots inside, and specifically in the center of the ground support polygon of the robot (polygons are not marked to prevent unnecessary complexity of the figure, that is for its better visibility).

In the preparatory position of robot, phase B1, all amount of liquid counterweight transferred to the chambers 108 and 109b of the left leg; the chambers 108 and 109a of the right leg emptied. The position of ground projection of CoM of solid body was not changed, the position of ground projection of CoM of liquid counterweight shifted to center of ground projection of lest foot, the position of ground projection of general CoM also shifted inside of the ground projection of the left foot.

In the critical phase C1, when the right foot does not touch the ground, the position of ground projection of general CoM remains inside of the ground projection of the left foot.

In the phase D1, the right foot touches the ground, and all amount of liquid counterweight transferred to the chambers 108 and 109b of the right leg, while the chambers 108 and 109a of the left leg emptied. The position of ground projection of general CoM shifted inside of the ground projection of the right foot.

In the critical phase E1, when the left foot does not touch the ground, the position of ground projection of general CoM remains inside of the ground projection of the right foot until the left foot touches the ground in phase E1.

In the final phase F1 the total load of counterweighing liquid is equalized between both legs as it was in the initial position of robot, phase A1.

Figure 2:
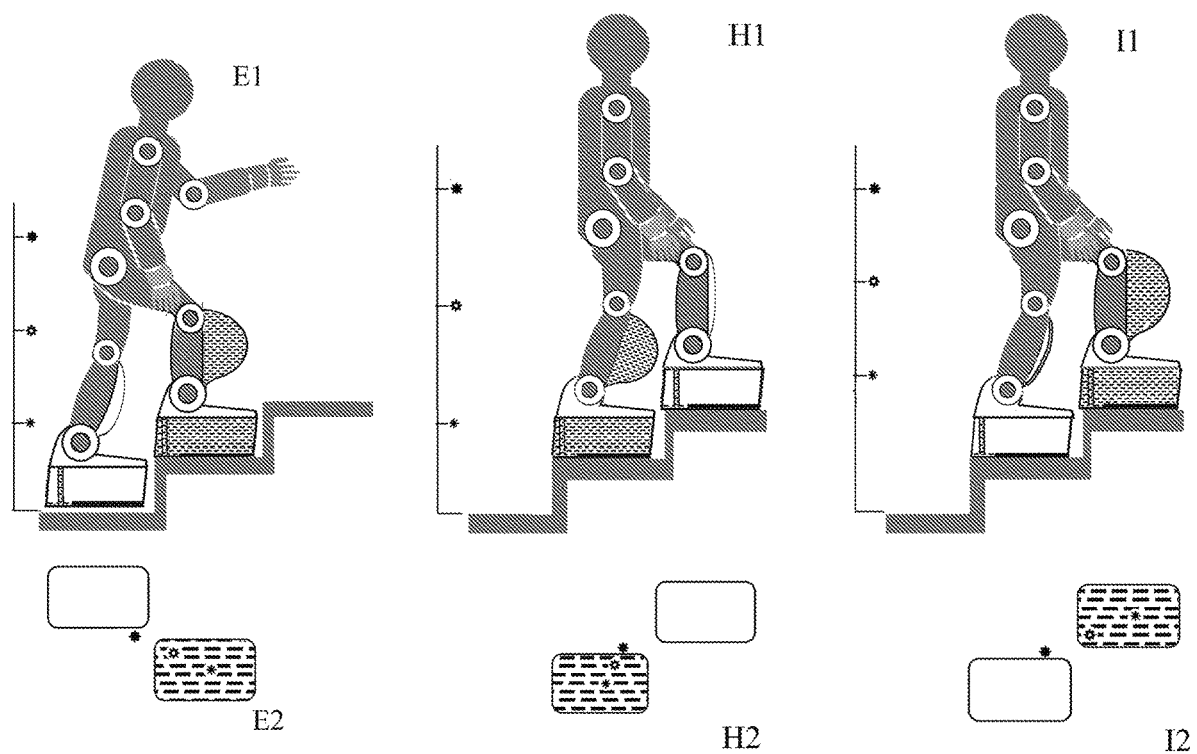
FIG. 2 shows the sequential stages of robot ascending stairs for the Humanoid embodiment of the invention.

FIG. 2 shows sequent phases of a humanoid robot mounting a stairway. Phases A1-E1 are identical to shown for ascending a singular step on FIG. 1 (note, phases A1-D1 are not shown on FIG. 2). Phases H1 and I1 and their corresponding ground projections H2, I2 on FIG. 2 (and the following similar phases not shown on FIG. 2) differ in that that they do not imply intermediate equalizing of liquid counterweight between the left and right chambers until the robot finally mounted on the top of staircase.

Figure 3:
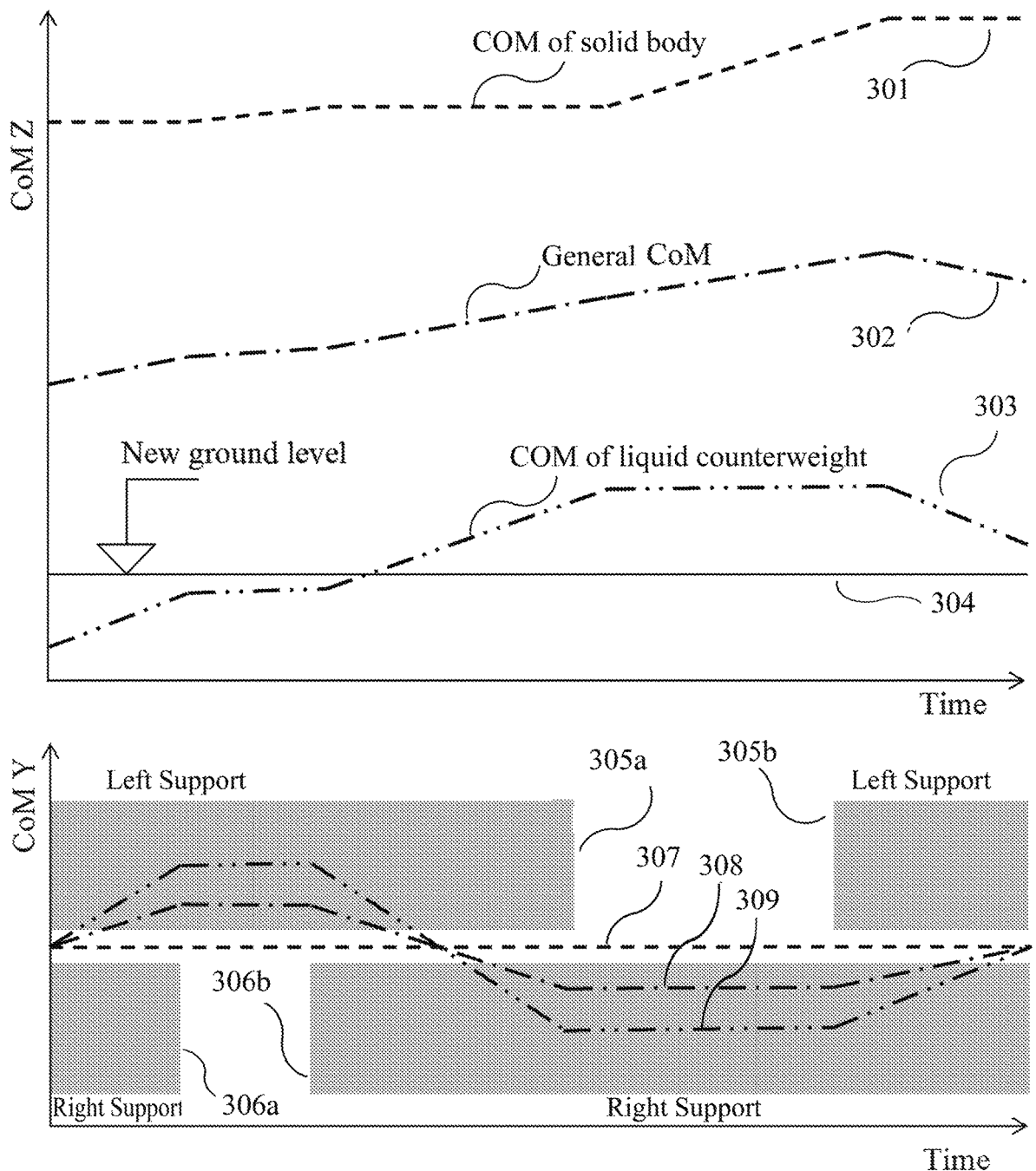
FIG. 3 shows diagrams illustrating the time dependence of position of Centers of Mass (CoM) relatively to the ground level and relatively to the left and right support areas of humanoid during ascending the stairs.

FIG. 3 shows diagrams illustrating the time dependence of position of the solid body CoM, position of liquid counterweight CoM and position of general CoM of the entire robotic system relatively to the ground level (top diagram) and relatively to the left and right support areas of humanoid (bottom diagram) during its ascending the stairs.

Specifically: On the top diagram, the curve 301 shows the time dependence of the altitudinal position of the solid body CoM, the curve 302 shows the time dependence of the altitudinal position of CoM for the entire robotic system including both solid body and liquid counterweight, and the curve 303 shows the time dependence of the altitudinal position of the liquid counterweight CoM; line 304 shows the level of new step. It is clear from the top diagram that the altitudinal position of COM of the entire robotic system is nearly 50% lower than of the altitudinal position of the solid body CoM, that is the CoM position of a robot with transferable liquid counterweight during the all ascending is almost two-fold lower than the CoM position of a conventional similar robot known from prior art without a transferable liquid counterweight.

On the bottom diagram, the shadowed areas 305a and 305b shows the width of the left support when the left foot of the robot is touching the ground, the shadowed areas 306a and 306b shows the width of the right support when the right foot of the robot is touching the ground, the curve 307 shows the time dependence of the ground projection of the solid body CoM, the curve 308 shows the time dependence of the ground projection of the CoM position for the entire robotic system, and the curve 309 shows the time dependence of the ground projection of the CoM position for the liquid counterweight relatively to the ground support areas. It is apparent from the bottom diagram that a robot with transferable liquid counterweight retains static stability during the entire ascending including the time intervals when right or left foot are detached from ground, while a conventional similar robot known from prior art without a transferable liquid counterweight during said interval must be supported with complex and less reliable dynamic balancing system.

It is evident from these examples that a transferable liquid counterweight allows a robot to maintain a quasi-static state and stability during its motion on uneven terrain or ascending the stairs, that is to adjust its CoM to new designated position while the solid body of a robot remains in static state and move the solid body to new designated position while retaining the ground projection of CoM in the ground support polygon and, hence, to retain its static stability during the motion.

Figure 4:
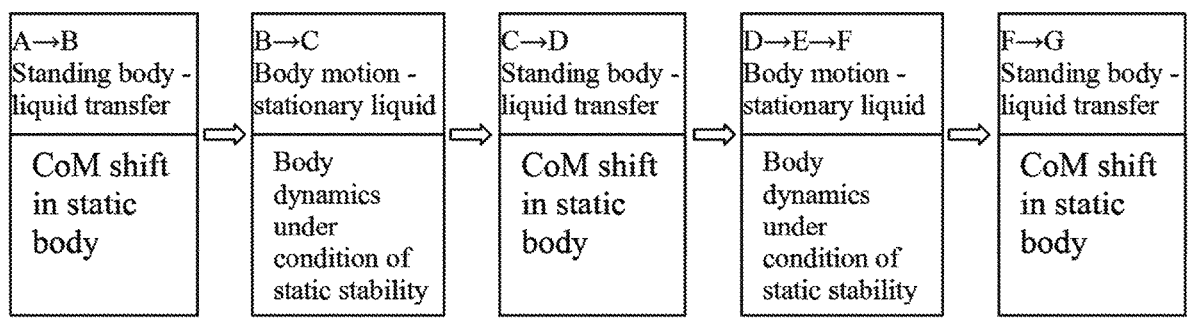
FIG. 4 is a flowchart showing alternating phases of body movement and liquid load transfer during robot motion on uneven terrain.

The flowchart shown on FIG. 4 illustrates such alternating phases of body movement and liquid load transfer during the robot ascending the stairs: "Standing body/liquid transfer-→Body motion/stationary liquid counterweight→ . . . "; Phases A, B, C, D, E, F, G on FIG. 4 corresponds to FIG. 1.

Figure 5:
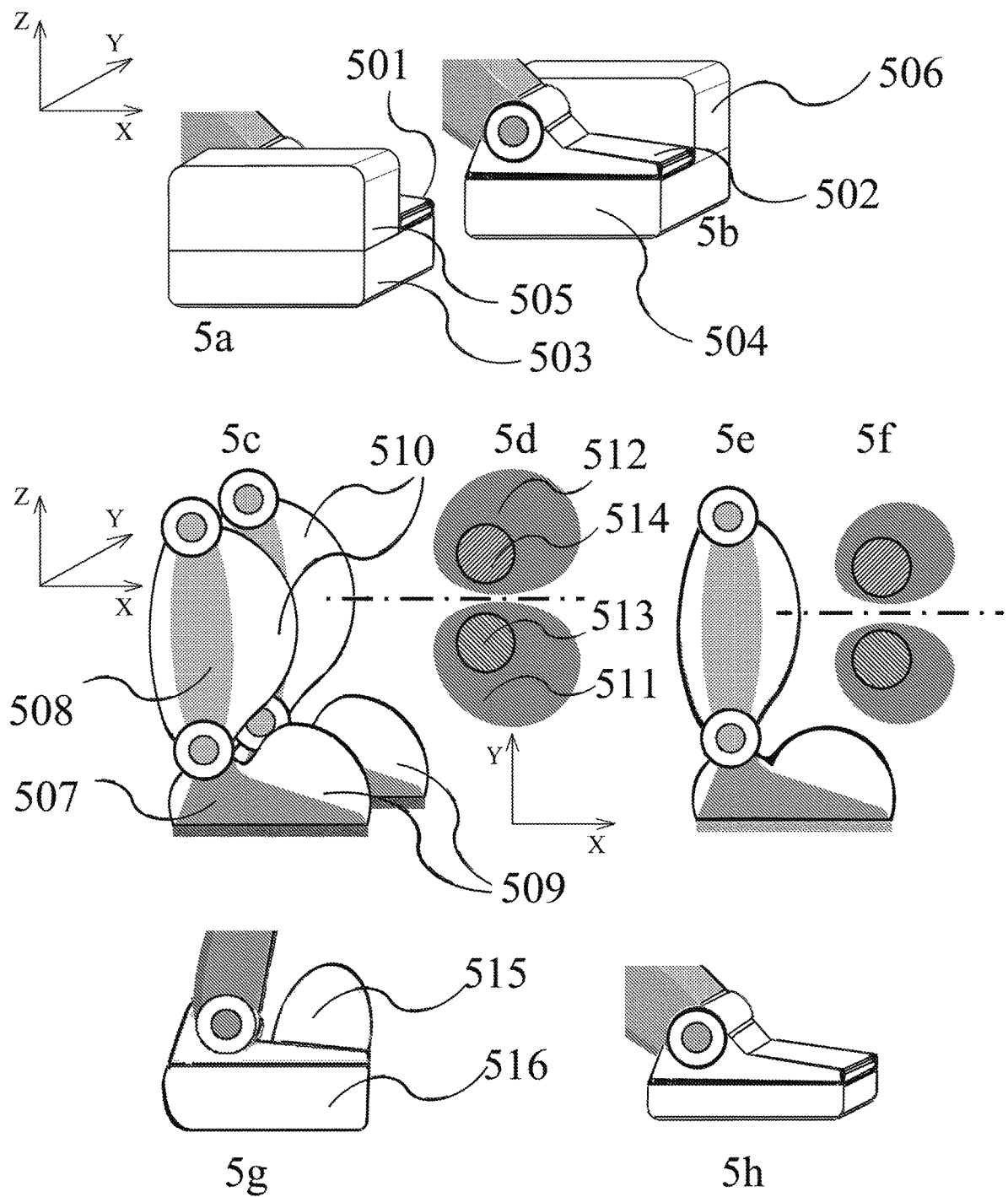
FIG. 5 shows a few alternative designs for liquid chambers and their positions on a humanoid robot.

It is important to note that the examples shown on FIG. 1 and FIG. 2 illustrate only one of possible designs of liquid chambers for humanoid robots. FIG. 5 shows four other examples of possible designs. The preference depends on specific kind of a robot and designated technical task. Any person of ordinary skill in the pertinent area could make and use the invention implementing any of designs shown on FIGS. 1,2 and 5 or employ some different design. Such design does not limit the essence of this invention as defined in claims.

Referring to FIG. 5, there are shown the following examples of alternative designs for liquid chambers and their positions on a humanoid robot:

FIGS. 5a and 5b show correspondingly right 501 and left 502 foots of a robot based on design allowing continuous retaining of the lowest position of CoM during the robot's motions. Two separated liquid chambers attached to each foot of a robot: the chambers 503 and 504 are attached under foots and the chambers 505 and 505 are installed upon the chambers 503 and 504 from external sides of the foots. Referring to the above disclosed example of humanoid with solid mass 50 kg and the maximal liquid bromoform counterweight equal to the solid mass 50 kg, each of the bottom chambers 503 and 504 have the following internal dimensions: length (along x-axis) 38 cm, height (along z-axis) 10 cm, width (along y-axis) 23 cm, internal volume 8.65 liters, maximal liquid load 25 kg; each of the top chambers 505 and 506 have the following internal dimensions: length L=38 cm, height 17.6 cm, width 13 cm, internal volume 8.65 liters, maximal liquid load 25 kg, equal to the bottom chambers.

The average thickness of the walls of chambers 3 mm. The external dimensions of four chambers are shown on FIGS. 5a and 5b in proportions to this example.

Besides the lowest CoM position, the advantages of this design are equal volumes of all chambers and their positioning outside of the main structure of the robot.

FIGS. 5c and 5d, 5e and 5f show examples of flexible liquid chambers designed as the boots of the robots: the shadowed areas 507 and 508 indicate volume occupied by the foots and shanks of the robot, 509—the low chambers, 510—the upper chambers; 511 and 512—cross-sectional view of the upper chambers, the patterned areas 513 and 514 indicate volume occupied by the foots and shanks of the robot.

In specific example proportionally illustrated by FIGS. 5c and 5d for robot with height 160 cm and mass 50 kg and maximal liquid counterweight equal to solid mass of the robot as in the examples explained above, the foot length 38 cm and maximal total width of foot 23 cm including thickness of the walls, the volume of each low chamber is 7 liters, the volume of each upper chamber is 10.3 liters, total maximal mass of liquid counterweight amassed in both chambers of one leg is 50 kg of bromoform.

FIGS. 5e and 5f show similar design for robot with height 160 cm and mass 50 kg and liquid counterweight equal to 60% of solid mass of the robot.

The advantages of the design shown on FIGS. 5c-5f, besides its simplicity, is due to flexibility of chambers: the lowest position of the solid foot of robot directly touching the supporting ground.

Alternatively, FIG. 5g shows design with flexible upper chambers 515 and rigid bottom chambers 516 wherein both kinds of chambers directly attached to solid foot of the robot. For maximal liquid counterweight equal to 100% of the solid mass of the robot, each of the rigid bottom chambers has external dimensions: length 38 cm, width 24 cm, and height from ground to the foot of the robot 15 cm with thickness of magnesium side walls 1.5 mm and thickness of the bottom wall 4 mm; the useful internal volume of each rigid chamber 13 liters; the volume of each of the flexible upper chambers 4.3 liters or 50 kg of bromoform, although it requires relatively large foot dimensions and distance up to 15 cm between the solid foot and supporting ground.

FIG. 5h shows similar design in the same scale for maximal liquid counterweight equal to 100% of the solid mass of the robot using the super-heavy liquid, that is mercury. It is apparent that where it is compatible with general requirements, the mercury liquid counterweight allows the utmost compactness and simplicity of the design.

The transferable liquid counterweight disclosed in this patent document provides the manifold empowering for the robots' maneuverability and stability while not implying any additional load on the robot mechanics during its motion on uneven terrain or during ascending. However, such substantial additional load is not However, such substantial liquid load is not commonly required during the robots' motion on even terrain.

As it will be clear from the following disclosure, there are various embodiments of the present inventions supporting effective motion of the robots with the transferable liquid counterweight on the even terrains.

Figure 6:
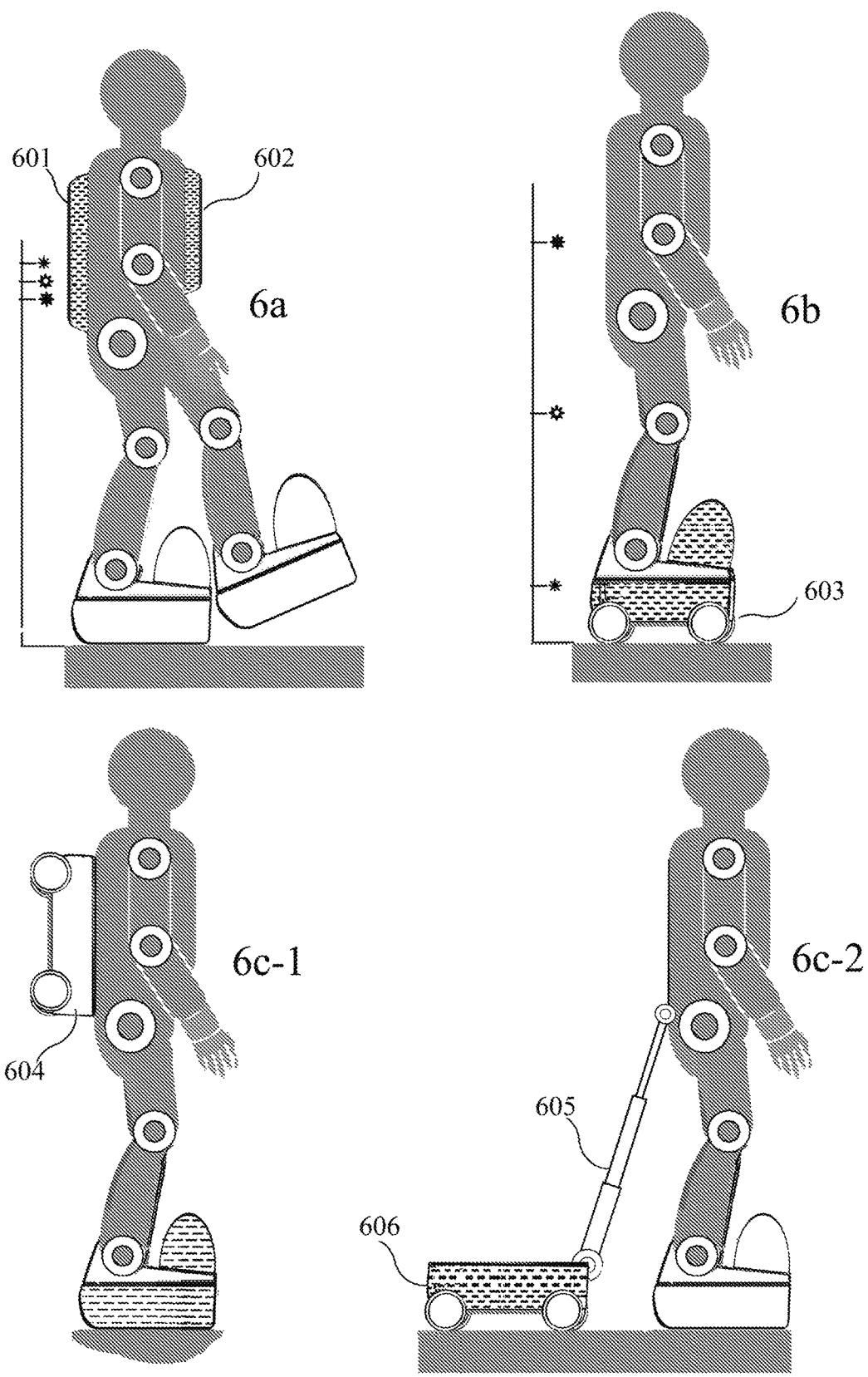
FIG. 6 shows views of the humanoid robots' effective moving on an even terrain in three different embodiments.

FIG. 6 shows views of the humanoid robots moving on an even terrain in three different embodiments:

In the embodiments illustrated by FIG. 6a, robot equipped with water jackets 601 and 602, and the entire liquid counterweight transferred in the jacket during the robot motion on even terrain. This embodiment allows compact general design with flexible jacket chambers made of fiber-reinforced plastic implying additional mass of about only 1% to the solid mass of the robot. The motion of the robot's leg is free from liquid load. However, the altitudinal position of CoM slightly increased, as its shown on z-axis at right.

In the embodiments illustrated by FIG. 6b, the bottom liquid chambers under foots of the robot equipped with retractable-extendable wheels 603 and may be equipped with miniature motors. The solid body of the robot is completely free from the liquid load, while the position of CoM almost two folds lower than in common design known from prior art, and the dynamic balance of the robot during its motion is significantly enhanced. This is the most preferable embodiments for robots moving on the normal roads or on the floors of the buildings.

In the embodiments illustrated by FIGS. 6c-1 and 6c-2, the robot is equipped with a wheeled rigid jacket 604 on its back; the jacket is detachable from the back while remaining connected with robot with pneumatic telescopic cylinder 605 and pipe for liquid transfer (not shown on the figure). During the motion of the robot on terrain, jacket is converted in the attached car 606, the liquid is transferred to the car, leaving robot free from liquid load. The jacket-car made of reinforced plastic and carbon-fiber composites, the wheels and cylinder made of magnesium alloy, additional solid mass of the robot is about 2%.

The advantage of this design is possibility of a normal motion of the robot on even as well as on slightly uneven terrain where the embodiment shown on FIG. 6b is inconvenient.

It is evident from the disclosure provided above that the transferable liquid counterweight provides significant enhancing of stability and dynamic balance for the bipod humanoid robot thus decreasing the risk of fall. Moreover, in the falling occurrence the transferable liquid counterweight and supporting devices decrease the probability of serious damage of the falling robot and provide effective means for its self-rising (or self-righting, using different term for this action).

Figure 7:
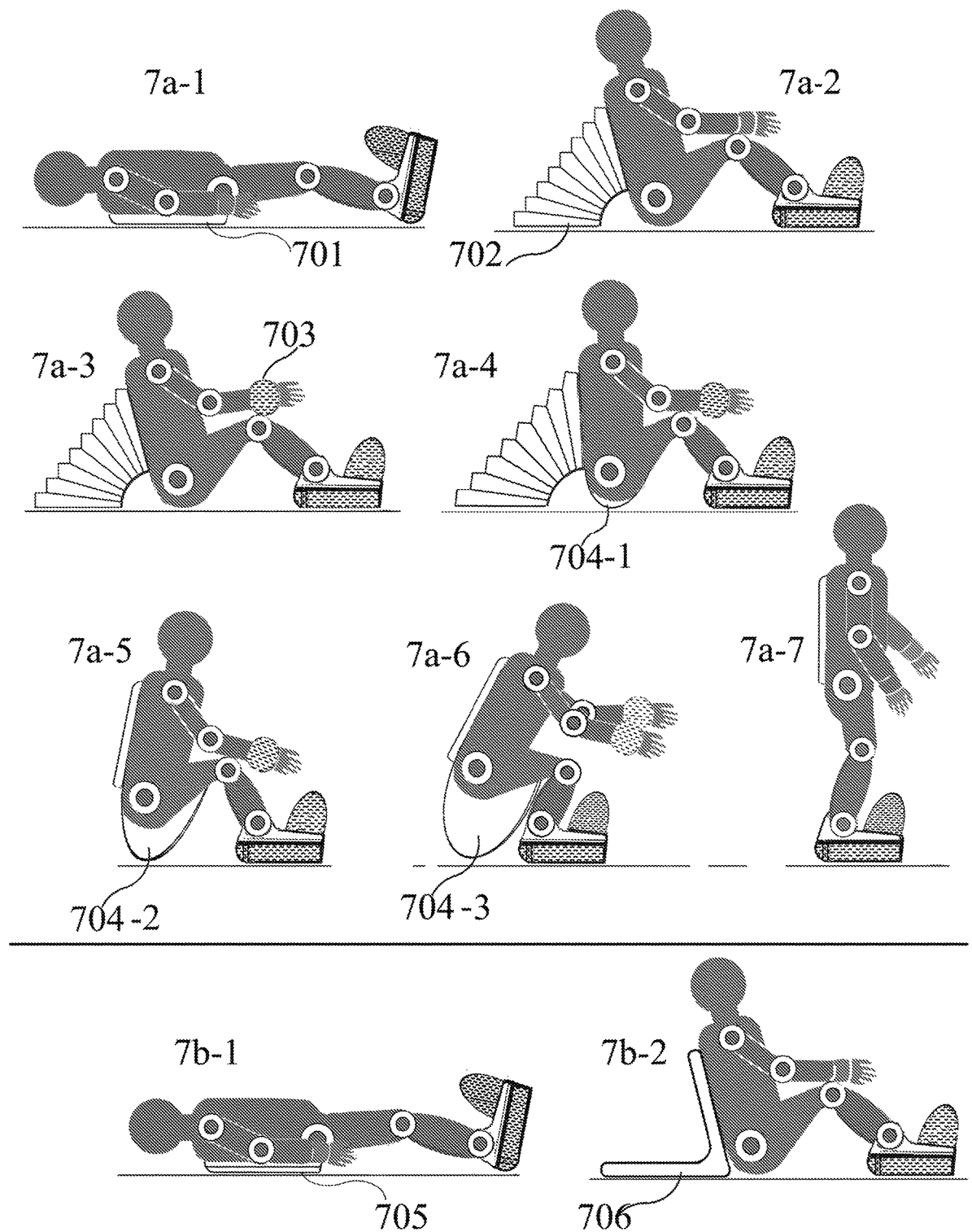
FIG. 7 shows the sequential stages of self-rising after fall for the Humanoid embodiment of the invention.

FIG. 7 shows the sequential stages 7a-1 to 7a-7 of the robot's self-rising after fall for the Humanoid embodiment of the invention. The flexible jacket 701 on the robot's back is also used as the inflatable by compressed air structure. During normal operation and motion of the robot, the jacket is deflated or filled with liquid, as described above. In the occurrence of fall on back, FIG. 7a-1, the jacket is softening a shock and then inflated as shown on 702 lifting robot to nearly vertical position of the upper part of the body, FIG. 7a-2; next, portions of the liquid counterweight are transferred into the flexible cuffs 703, FIG. 7a-3, further shifting the ground projection of CoM to the right side; next, the inflatable flexible pillow 704-1 is filled with air, FIG. 7a-4, allowing robot to restore the vertical position of the upper part of its body; next, the flexible pillow further inflated (704-2, FIGS. 7a-5 and 704-3, FIG. 7a-6), allowing robot to incline ahead further shifting the ground projection of CoM to the right side until it securely localized in the ground support polygon; from this position robot may easily restore its normal functional position, FIG. 7a-7.

FIGS. 7b-1 and 7b-2 show a different design of the back jacket as a pneumatic spring (705, 706). This design is more compact and simple, but the preference depends on the entire design of the robot and should be specifically adjusted.

The Locomotion Wheeled Robots Embodiments

The locomotion wheeled robots on even or slightly uneven terrains usually retain condition of static mobility maintaining the ground projection of the center of mass in the margins of the Ground Support Polygon, but there are relatively strict limitations of accessibility of uneven terrain for the wheeled robots.

Figure 8:
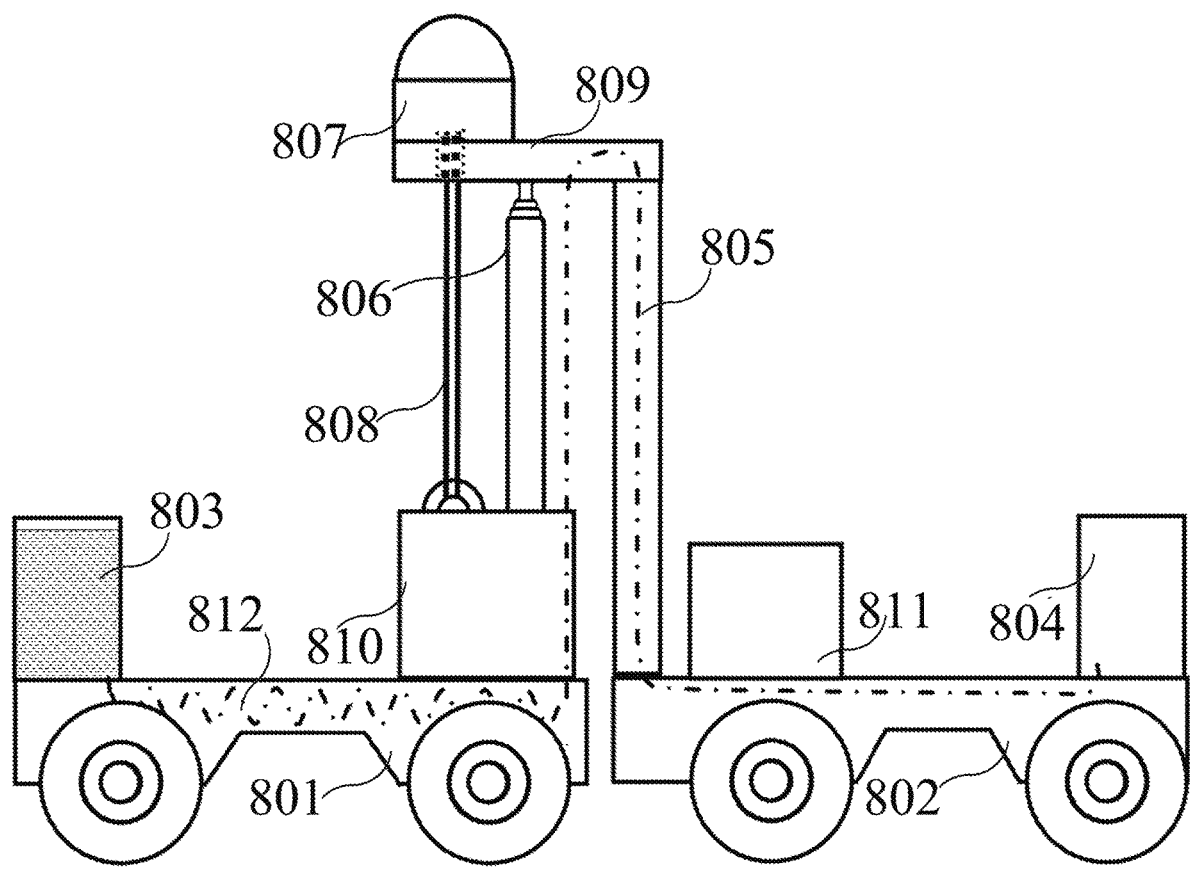
FIG. 8 shows preferable configuration of a relatively light wheeled locomotion robot embodiment of the invention.
Figure 9:
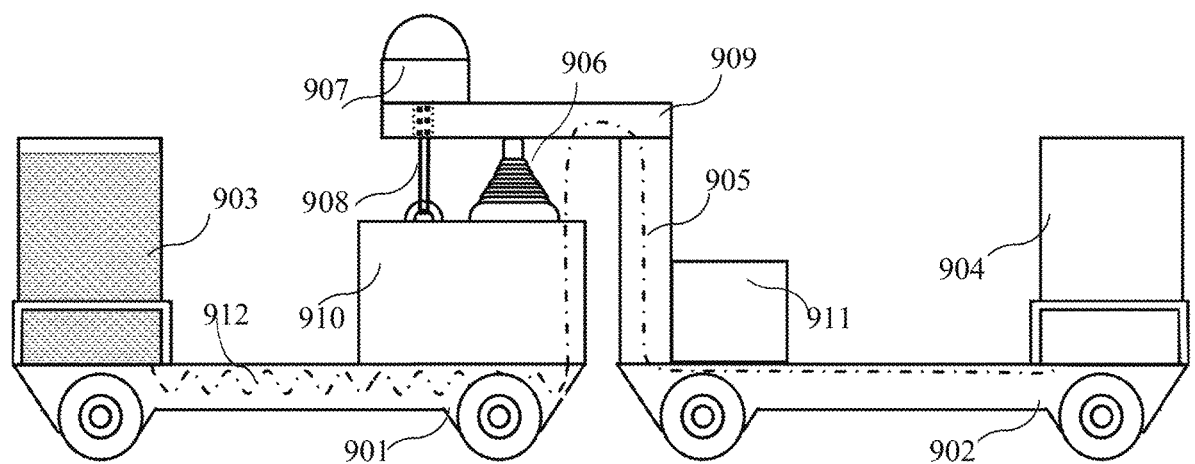
FIG. 9 shows preferable configuration of relatively heavy wheeled locomotion robot embodiment of the invention.

As it will become clear from the following examples, the transferable liquid load significantly extends the scope of capabilities of the wheeled robots. FIGS. 8 and 9 show respectively the examples of a relatively light and relatively heavy wheeled locomotion robot embodiments of the invention and FIGS. 10 and 11 illustrate their extended functionality, which is not achievable by robots known by the prior art.

Example 1 a Relatively Light Wheeled Locomotion Robot Embodiment of the Invention FIG. 8 shows one of preferable configurations of a relatively light wheeled locomotion robot embodiment of the invention.

The locomotion robot consists of two cars 801 and 802. Each car has tank for liquid counterweight 803 and 804 of equal capacities. Specifically, on FIG. 8, the tank 803 is filled with liquid; in this and the following examples the counterweighing liquid is water. The tanks are connected with the water transfer flexible pipe 805 and spring-loaded folding flexible pipe 812. The cars 801 and 802 have double flexible connections. First, the car 802 is connected with the car 801 through console 809 and telescopic hydraulic cylinder 806; the base outer jacket of cylinder 806 is fixed to the box 810 rigidly installed on the car 801, the opposite side, that is the external end of the sliding rode of the cylinder 806, is rigidly fixed to console 809. The second connection is realized through hoister; the hoister 807 with electrical motor is installed on console 809, and the cable 808 of the hoister is attached to box 810. Each of the cars 801 and 802 has driving motor; the motors are installed in boxes 810 and 811. The hydraulic system of the telescopic hydraulic cylinder 806 also installed in box 810.

For a specific example, the following characteristics of apparatus are in geometric proportions to the shown on FIG. 8: The width of each car 800 mm; the length of each car 1400 mm; the dimension of the each water tank, mm: 800 (across the width of the cars)×250×450 (height). The maximal capacity of the each water tank: 90 liters; actual liquid load in the example: 80 liters. Each tank has built-in air compressor for gas-driving water transfer. The drivetrains and frames of the cars and structural components of telescopic cylinders made of magnesium alloy, water tanks are made of fiber-reinforced plastic. The wheels 12" are pneumatic. Weight of frames and drivetrains: left—25 kg, right 20 kg. Weight of each tank including compressor with motor without water 6 kg.

Motors: motor on the left car used as the main driving motor of the robot and for hydraulic cylinder (alternatively) 500 W, 25 kg; driving motor on the right car 300 W, 15 kg; motor of the electrical hoister 400 W, 20 kg.

Telescopic cylinder: 3 stages, diameters 90 mm; 70 mm; 50 mm; stroke 3,150 m m; closed length 1,320 mm; hydraulic oil capacity 13.5 liters; total weight of telescopic hydraulic system 30 kg.

Three Lithium-ion battery:

1. main battery powering the hydraulic lifting system and drivetrain in the left car—20 kg, 2.56 kWh.

2. electrical hoister, 10 kg, 1.28 kWh 3. drivetrain in the right car, 4 kg, 0.5 kWh Other components—2 kg on each car.

Total weight of cars:

Left car without water: 108 kg; right car without water: 77 kg.

Maximal speed of the entire robot on even road 5 km/h without liquid counterweight and without cargo; 4 km/h with 80 kg liquid counterweight without cargo; 3 with 90 kg liquid counterweight with cargo up to 50 kg on right car and up to 100 kg on right car (up to 150 kg total).

Maximal speed during the maneuvering motions of the right car 0.5 km/h.

Maximal allowed cargo with 90 liter counterweight: left up to 50 kg+right car up to 100 kg, up to 150 kg total.

Maximal height in a one-step rising: 3 meters, that is over free folds greater than the maximal height of the exemplified mobile robotic system on an even terrain.

Example 2 a Relatively Heavy Wheeled Locomotion Robot Embodiment of the Invention FIG. 9 shows preferable configuration of relatively heavy wheeled locomotion robot embodiment of the invention. The principle system design is similar to the above described example of the relatively light wheeled robot (FIG. 8 and the Example 1).

The main difference of relatively heavy wheeled locomotion robot embodiment is employment of a powerful multi-stage telescopic hydraulic cylinder providing a significantly greater stroke, as well rigidity of extended cylinder; this, in turn, allows substantially higher altitude in one-step rising action as well as greater cargo.

The components of system are principally the same: the locomotion robot consists of two cars 901 and 902. Each car has tank for liquid counterweight 903 and 904 of equal capacities. Specifically, on FIG. 9, the tank 903 is filled with s water. The tanks are connected with the water transfer flexible pipe 905 and spring-loaded folding flexible pipe 912. The cars 901 and 902 have double flexible connections. First, the car 902 is connected with the car 901 through console 909 and telescopic hydraulic cylinder 906; the base outer jacket of cylinder 906 is fixed to the box 910 rigidly installed on the car 901, the opposite sliding end of the cylinder 906 is rigidly fixed to console 909. The second connection is realized through hoister; the hoister 907 with electrical motor is installed on console 909, and the cable 909 of the hosier is attached to box 910. Each of the cars 901 and 902 has driving motor; the motors are installed in boxes 910 and 911. The hydraulic system of the telescopic hydraulic cylinder 906 also installed in box 910.

The exemplified specific characteristics in geometric proportions as shown on FIG. 9 are the following:

The width of each car 1000 mm
The length of each car 2000 mm
The maximal capacity of the each water tank: 400 liters; actual liquid load in the example: 250 liters.
Telescopic cylinder: 10 stages (the outer diameters, mm) 52×66×80×94×109×125×141×158×178×200;
closed length 780 mm; stroke 5,200 mm
hydraulic oil capacity 41 liters; total weight of telescopic hydraulic system 87 kg.
Total weight of the cars
Left car without water: 220 kg
Right car without water: 120 kg
Maximal allowed cargo with 400 liter counterweight: left up to 100 kg and right car up to 250 kg, up to 350 kg total.
Maximal height in a one-step rising: 5 meters.

Figure 10A:
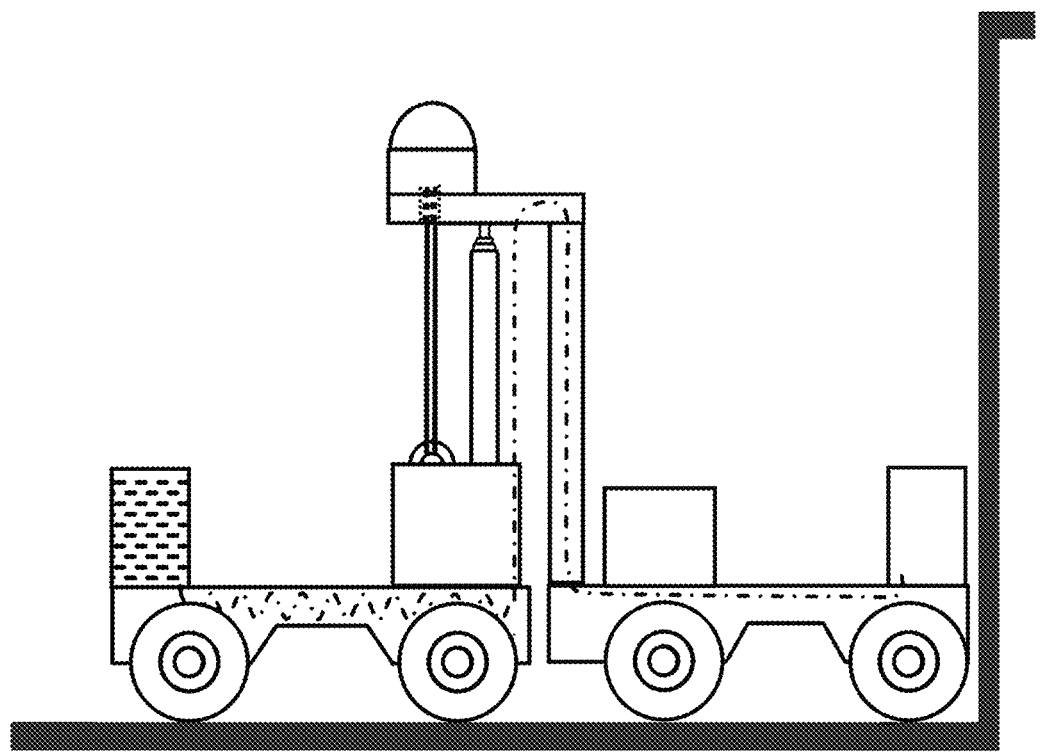
FIGS. 10a, 10b, 10c, 10d, 10e, 10g, 10h and 10i show a self-mountaineering relatively light wheeled locomotion robot ascending a high vertical ledge.
Figure 10B:
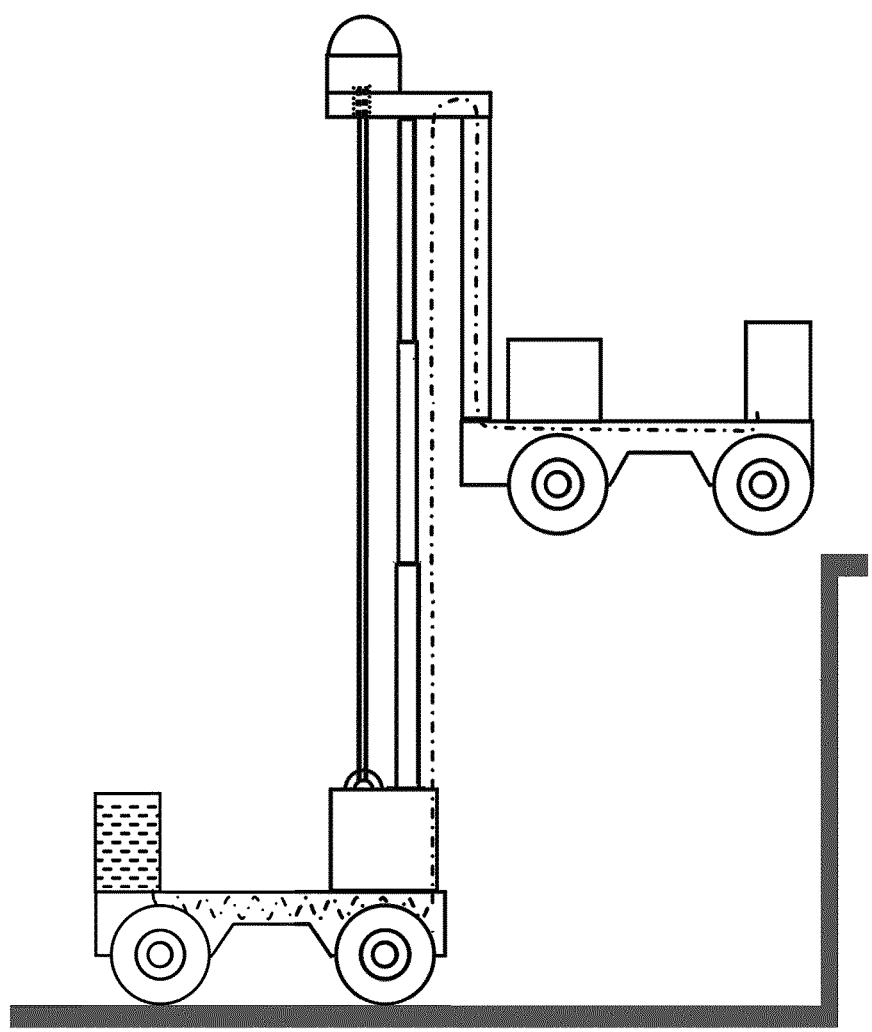
Figure 10C:
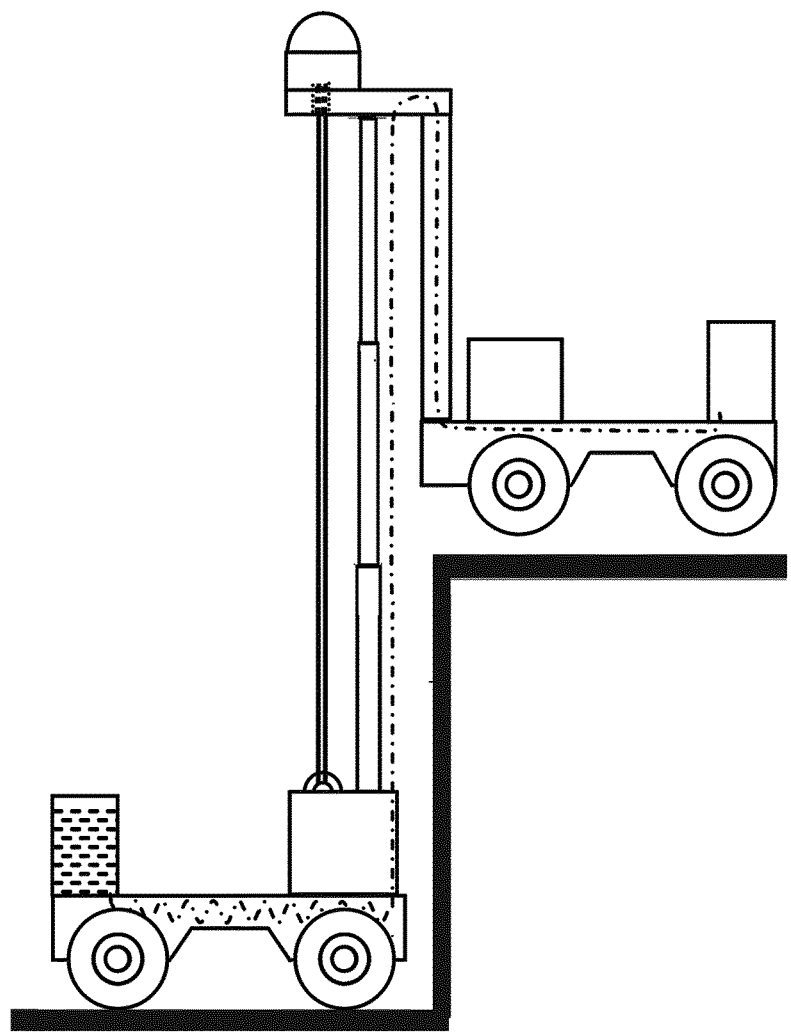
Figure 10D:
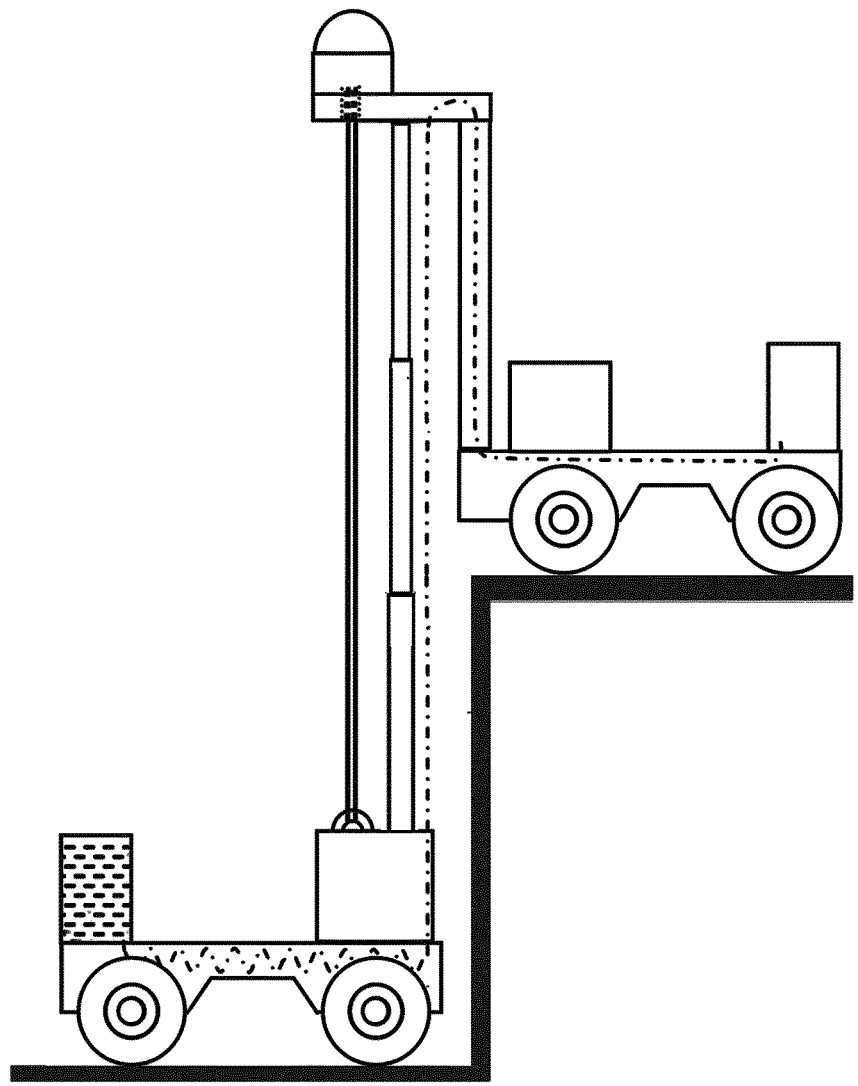
Figure 10E:
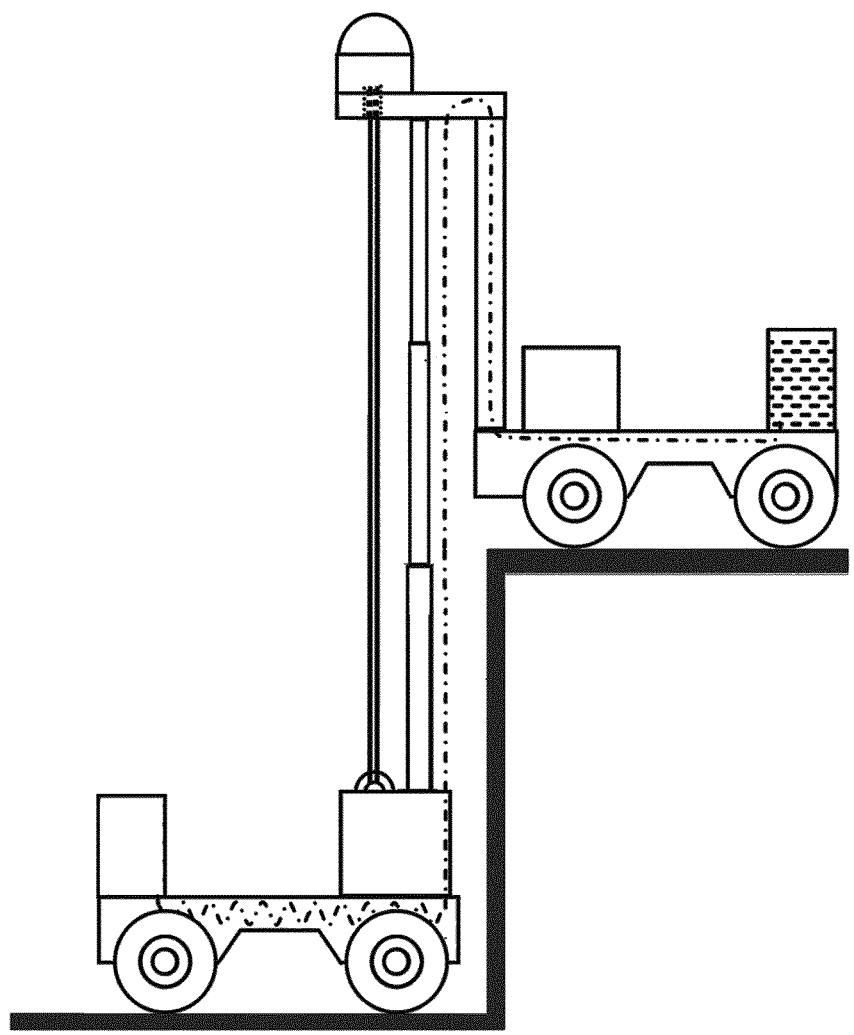
Figure 10G:
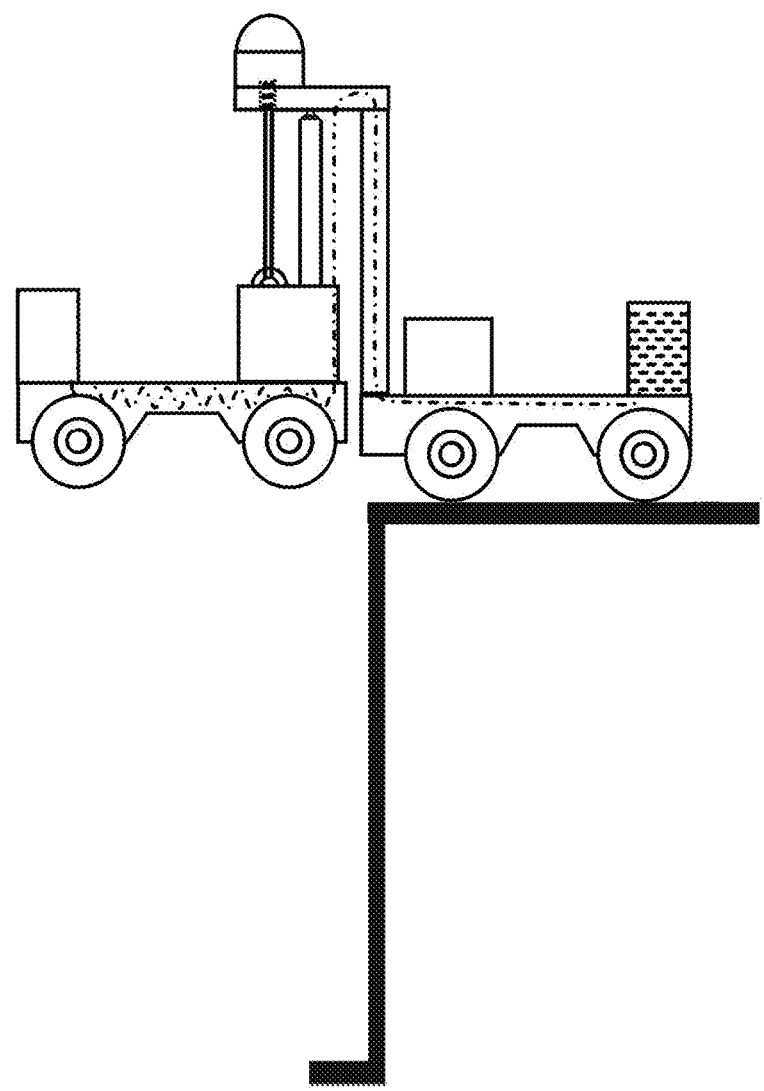
Figure 10H:
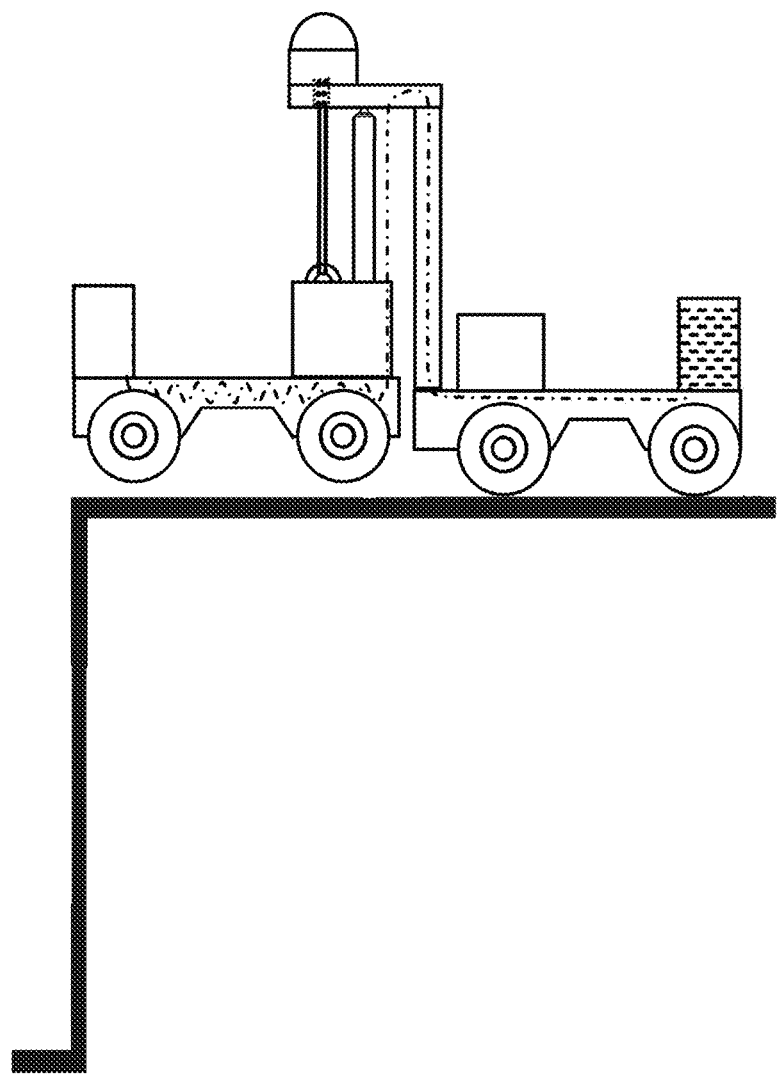
Figure 10I:
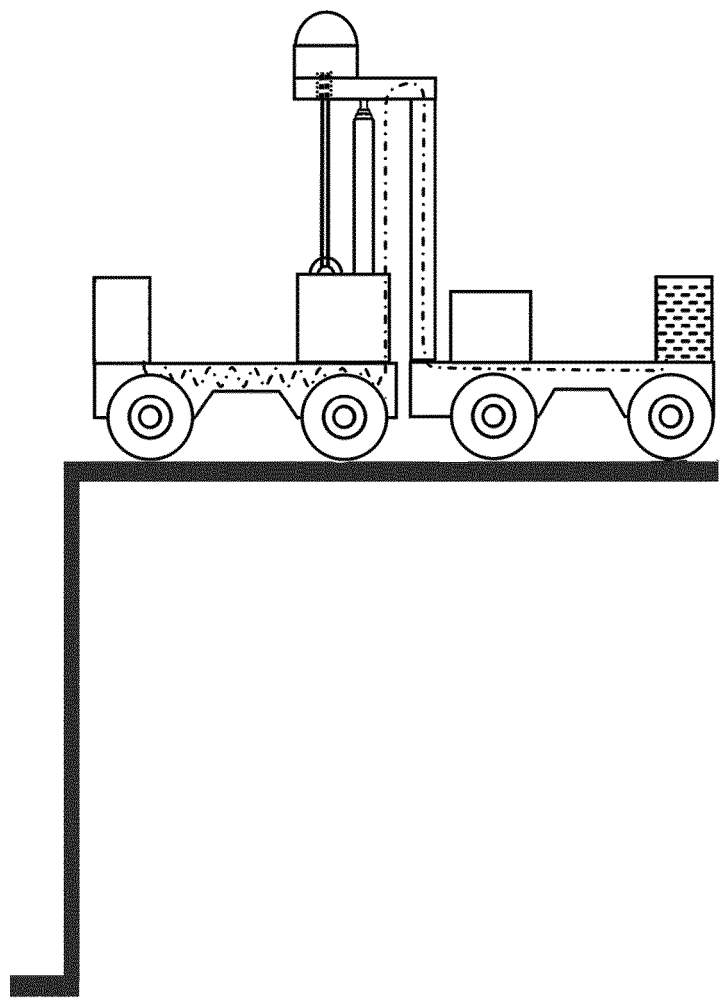
Figure 11:
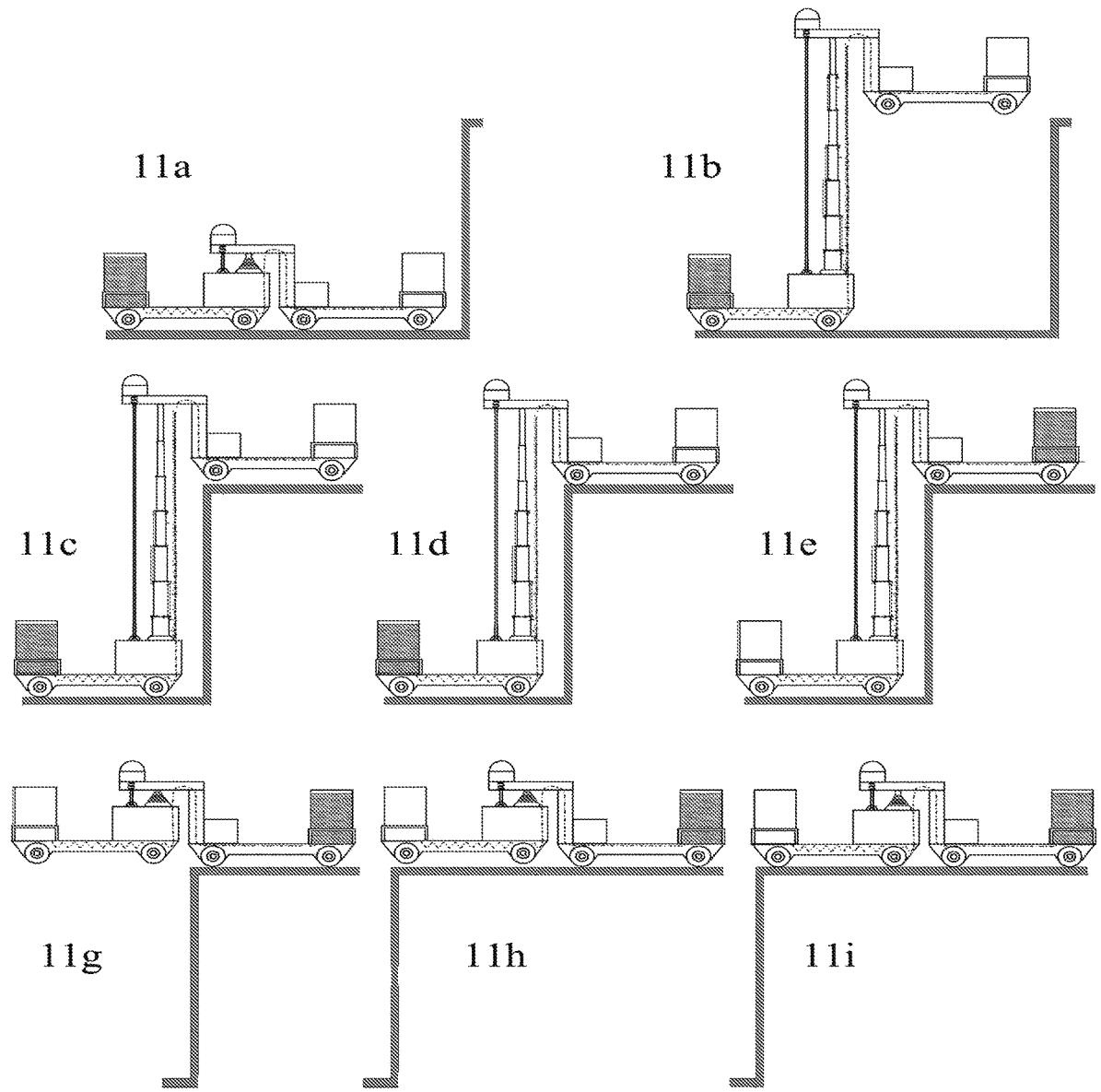
FIG. 11 shows a self-mountaineering relatively heavy wheeled locomotion robot ascending a high vertical ledge.

FIGS. 10 (10*a*-10*i*) show series of subsequent steps of self-mountaineering for relatively light wheeled locomotion robot shown on FIG. 8 and specified in Example 1. It may be seen from FIGS. 10*a*-10*j* that the robot is able to ascend a 3-m high vertical ledge:

FIG. 10*a* shows initial position of the robot at the face of the 3-m high ledge; the liquid counterweight is amassed in tank installed on the left car;

FIG. 10*b* shows the right car of the robot is lifted by telescopic hydraulic lifting system on the height of 3,150 mm, that is 150 mm above the ledge;

FIG. 10*c* shows the next stage of the ascending with left car approaching the edge to a practically feasible proximity, and the right car takes position above the upper plateau;

FIG. 10*d* shows the next stage when the right car is grounded on the upper plateau;

FIG. 10*e* shows that at the following stage the counterweighing water is transferred into the tank installed on the right car, which is already ascended the ledge; in this position about 58% of the total mass of robot is accumulated on the right car; more specifically, the total mass located to right side from the edge of ledge, including left car, console and holster is 122 kg and the ground projection of this total mass CoM is located at 310 mm to the left side from the edge of the ledge; the total mass located to right side from the edge of ledge is 143 kg, and the ground projection of this total mass CoM is located at 750 mm to the right side from the edge of the ledge, the momentums' ratio is 2.83;

FIG. 10*g* shows the left car of the robot is lifted by electrical hoister lifting system on the height of 3,150 mm, that is 150 mm above the ledge;

FIG. 10*h* shows that the right car carrying the left car above the ground moved further to the right until the left wheels of the left car are securely located to the right side from the edge of the ledge;

FIG. 10*i* shows that the both car of the robot are finally grounded on the upper terrain.

FIG. 11 shows a self-mountaineering relatively heavy wheeled locomotion robot shown on FIG. 9 and specified in Example 2 ascending a 5-m high vertical ledge.

The stages 11*a* to 11*i* are similar to the above described stages 10*a*-10*i*, however, the height of the ledge is 5 meters, the telescopic lifting system is substantially more powerful and significantly more rigid, the greater length of the cars and greater absolute and relative counterbalancing liquid mass provide highly-secured ascending and ability to carry not only cargo, but also passengers.

The Hybrid Wheeled/Bio-Like Robotic Systems' Embodiments

The transferable liquid counterbalancing methods also allow embodiments practically realizing various Hybrid Robotic Systems, such as Wheeled/Bio-like Locomotion Robots, beneficially combining technical and natural configurations and reconfigurable systems, thus, bringing to practice the respective advantages. FIGS. 12-16 illustrate examples of wheeled multi-car trains capable to ascend steeply inclined terrains.

FIG. 12*a* shows a general view of the train. In the shown simplest example, the train consists of 5 cars: 1201 is the rear locomotive car, 1202-1204 are the intermediate cars, 1205 is the front locomotive car, 1206 is the functional robotic car. Both locomotive cars carry tanks 1207, 1209 for transferable liquid counterweight 1208 shown on FIG. 12*a* in the tank of the front locomotive car. The functional robotic car carries the functional robot 1210, which during transportation placed in folded configuration to secure the lowest position of CoM. The wheels with solid tires 1211 have relatively large diameter and installed slightly extending beyond the front and rear edges of the car chassis to empower maneuverability on uneven terrains. Cars connected with joints 1212 allowing up/down swing and with one-stage hydraulic telescopic cylinders 1213 shown on FIG. 12*a* in retracted state. In this specific example, all the hydraulic telescopic cylinders of the robotic system are single-acting. The double-acting telescopic cylinders may be also employed providing certain improvements in the system maneuverability with the price of some increase in weight and complexity.

FIG. 12*b* shows two adjacent cars with hydraulic telescopic cylinders in the extended state 1213(*ext*). Each car of the train has autonomic hydraulic system with pumps, but only cars 1201 and 1205 have driving motors or engines.

FIGS. 12*c*, 12*d*, 12*e* show the sequent configurations 1210, 1214, 1215 of the functional robot in the process of unfolding after the robotic train reached a destination point. In the illustrating example, the functional robot comprises the upper part of the humanoid with arms and head.

Accordingly to the present invention, the robotic train is capable to use any of three modes of motion depending on the practical task in progress and the current conditions of a terrain: 1. on even terrains, the preferable mode is the motion as common train with all hydraulic telescopic cylinders in retracted state; 2. on uneven terrains and while ascending the slopes, the preferable mode is the wave-like motion empowered by the consecutively extending hydraulic systems; 3. in some particular conditions, such as particularly steep slopes, the motion empowered by concurrently extending a few or all hydraulic systems is possible and may be preferable. The self-descriptive FIGS. 13*a*-13*g* show the wave-like motion empowered by the consecutively extending hydraulic systems.

FIGS. 14*a*-14*d* show the initial stages of a slope ascending. At the original stage 14*a* at the front of a slope, the liquid counterweight is amassed in the front locomotive car. The stage 14*b* made under driving force of the front locomotive car with a partial free motion of telescopic cylinder connecting the front locomotive car with the functional robotic car. The stage 14*c* made by full extension of this telescopic cylinder empowered by the corresponding hydraulic system. At the stage 14*d*, the liquid counterweight is transferred from the front locomotive car to the rear locomotive car. Beginning from this stage and until the front locomotive car and the functional robotic car reached and reliably grounded upon the even terrain uphill, the further ascending is conducting under driving force of the rear locomotive car and by hydraulic systems using the option "2" or "3" as described above in the paragraph [0118].

FIGS. 15*a*-15*e* show the final stages in this example of ascending. After the front locomotive car and the functional robotic car reached and reliably grounded upon the even terrain uphill, the liquid counterweight is transferred again in the front locomotive car as show FIG. 15*b*. The final ascending of the train is empowered by the driving force of the front locomotive car until the entire train is positioned on the terrain uphill as shows FIG. 15*c*. Then the functional robotic system is unfolded to the working position as show FIGS. 15*d* and 15*e*. In such configuration, the functional robotic system resembles the "wheeled centaurs" thus beneficiary actualizing the ancient imaginative concept.

It is important to note that while in the illustrating example for the purpose of visibility shown only 3 intermediate cars, the number of the practical intermediate cars in the robotic train accordingly to the present invention and correspondingly the available height of ascending may be significantly greater. Moreover, the cars may be equipped with anchors (or paws, using bio-like terms) allowing ascending the slope exceeding the fully extended length of the train. FIGS. 16*a* and 16*b* show two intermediate stages of such ascending: the anchors 1601 are in "weighed" positions and the anchors 1602 are in "anchored" positions.

It is preferable accordingly to the present invention that all solid components of robotic systems, when their functionality allows, are made from ultra-light materials, such as magnesium and magnesium alloys, including lithium-magnesium alloys, and carbon-fiber composites. The maximal allowed length of the train, in particularly the number of intermediate cars, and hence—the maximal difference of the altitudes between the successive plateaus is defined by ratio of the combined mass of the front locomotive car with liquid counterweight and the combined mass of the intermediate cars and the rear car without liquid load.

Figure 12:
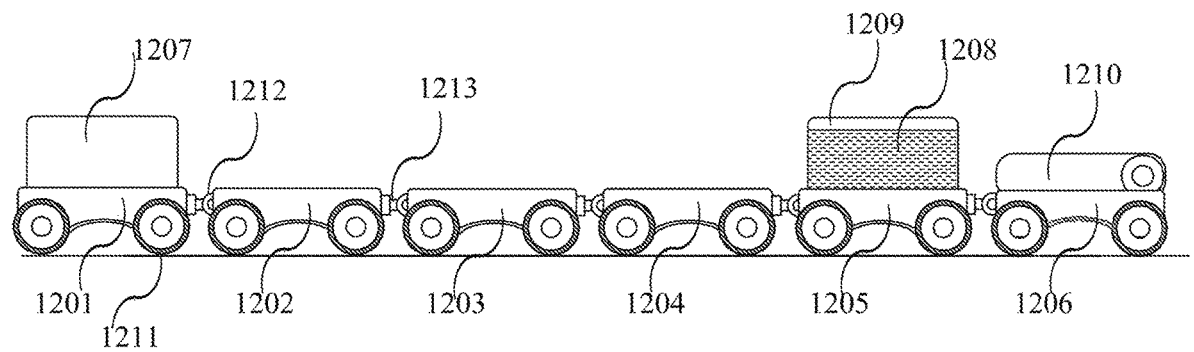
FIG. 12 shows a general view of Hybrid Robotic Systems—Wheeled/Bio-like Locomotion Robotic train.
Figure 12:
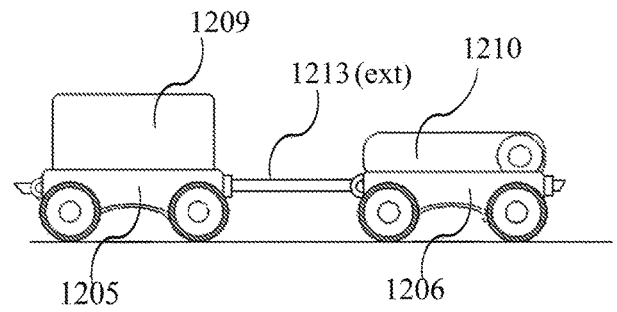
Figure 12:
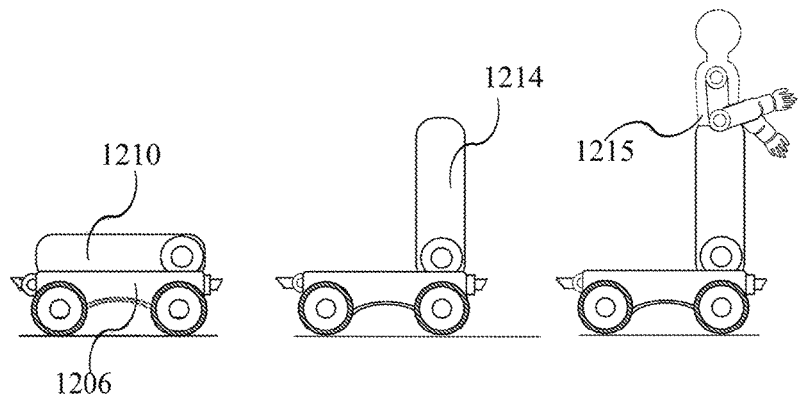
Figure 13:
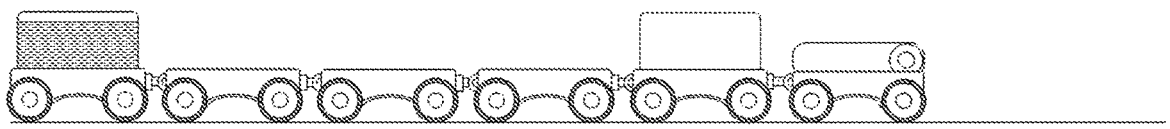
FIG. 13 shows the wave-like motion of the Wheeled/Bio-like Locomotion Robotic train.
Figure 13:
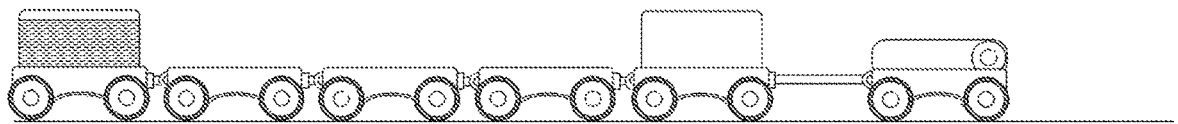
Figure 13:
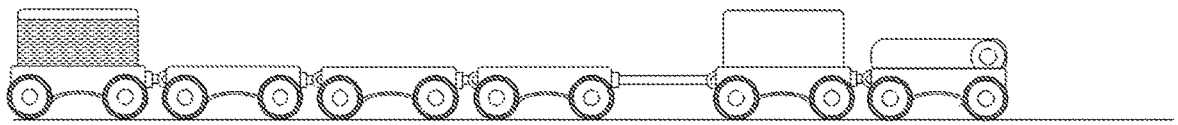
Figure 13:
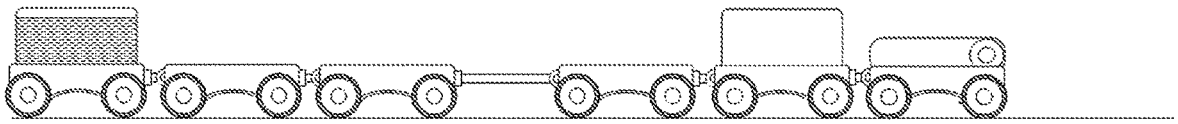
Figure 13:
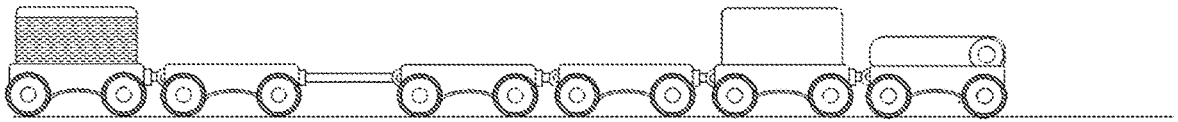
Figure 13:
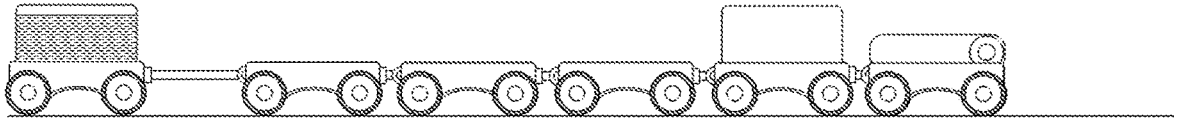
Figure 13:
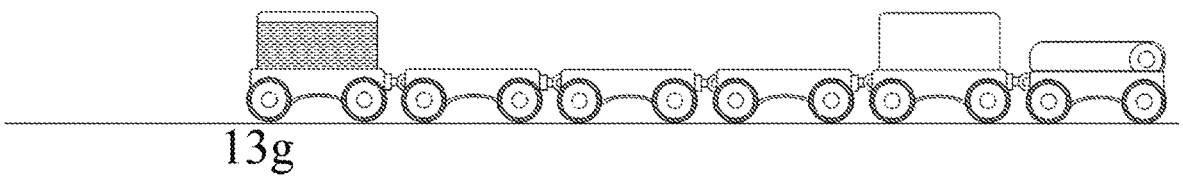
Figure 14:
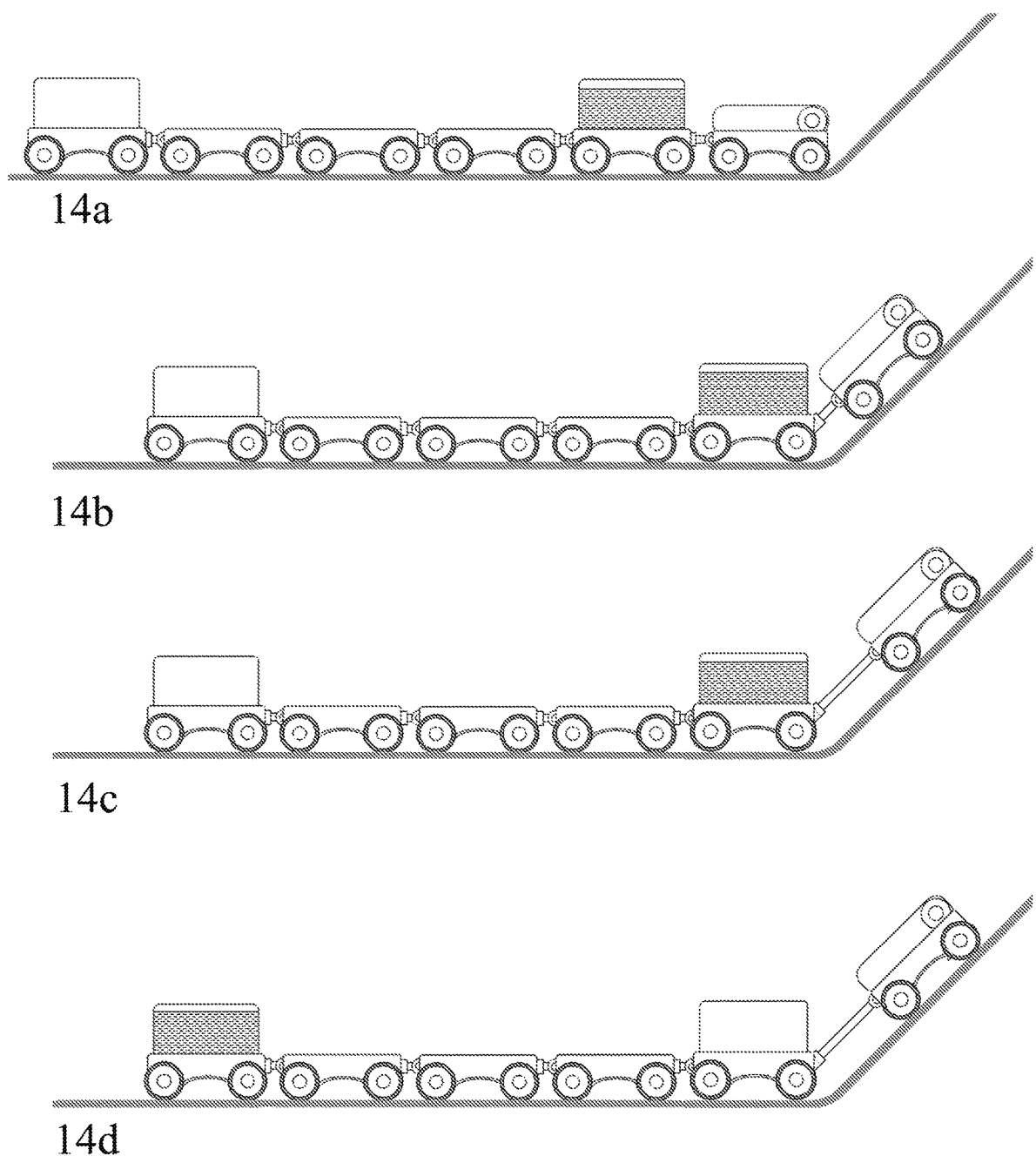
FIG. 14 shows the initial stages of a slope ascending.
Figure 15:
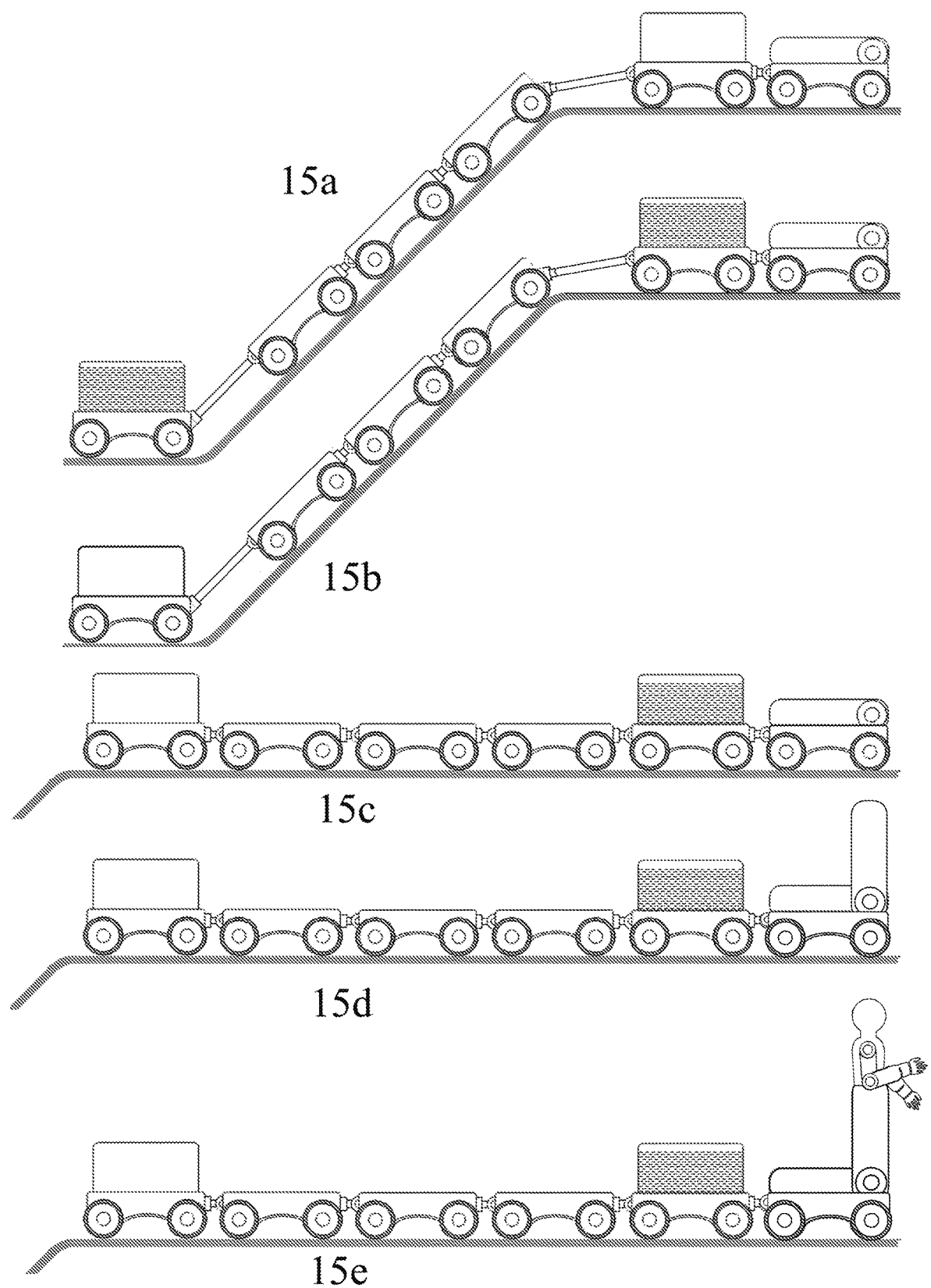
FIG. 15 shows the final stages in this example of a slope ascending.
Figure 16:
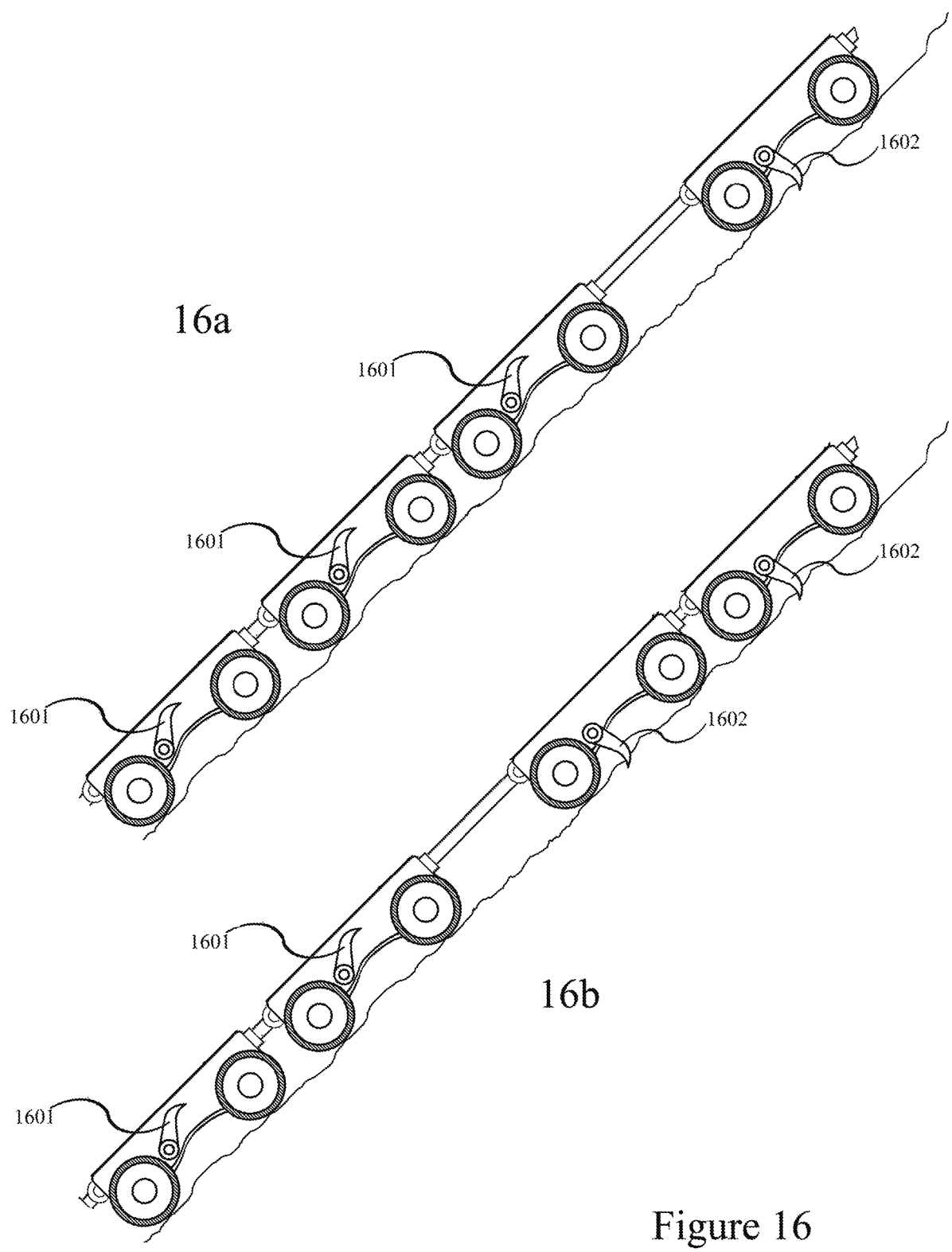
FIG. 16 shows ascending assisted with the anchors/paws.

In specific example proportionally corresponding to FIG. 12, each car has length 80 cm, width 50 cm, height (except tanks and functional robot) 30 cm. Lithium batteries distributed at the bottoms among all the cars, in spite the major energy consumption is due to functionality of locomotive cars during transportation and to the functional robot at a designated point. The CoM of each car located at 20 cm above the ground in proximity of geometric centre of the car ground projection (measured on a horizontal terrain); the mass of each intermediate car including hydraulic system and lithium batteries 5 kg; mass of each locomotive car including plastic tank but without liquid load 12 kg; mass of the car with functional robotic system 30 kg; this car carries greater load of batteries that also maintains its CoM at relatively low position 25 cm above the ground; the length of this car is 90 cm (slightly different in proportion from shown on FIG. 12). The useful volume of each tank is 100 liters; the maximal number of intermediate cars 8; the stroke of telescopic cylinder is 60 cm; total length of intermediate chain of cars with extended cylinders 12 m; maximal possible inclination of slope 60°; preferable maximal inclination of slope 55°; the maximal difference of the altitudes between the successive plateaus 10 m.

The disclosed transferable liquid counterbalancing methods method and apparatuses also imply the embodiments with structurally reconfigurable robots including hybrid manned-robotic systems, bio-like multi-pod robotic devices as caterpillar or spider and also allows reversible mutual transforming between various bio-like arrangements practically beneficially actualizing real and imaginative bioforms, such as centaurs. Some embodiments of the disclosed method and apparatuses may comprise a plurality of movable parts, each part contains its chamber. Below, some examples are given for illustration.

The Hybrid Manned/Autonomous Robotic Systems' Embodiments

Figure 17:
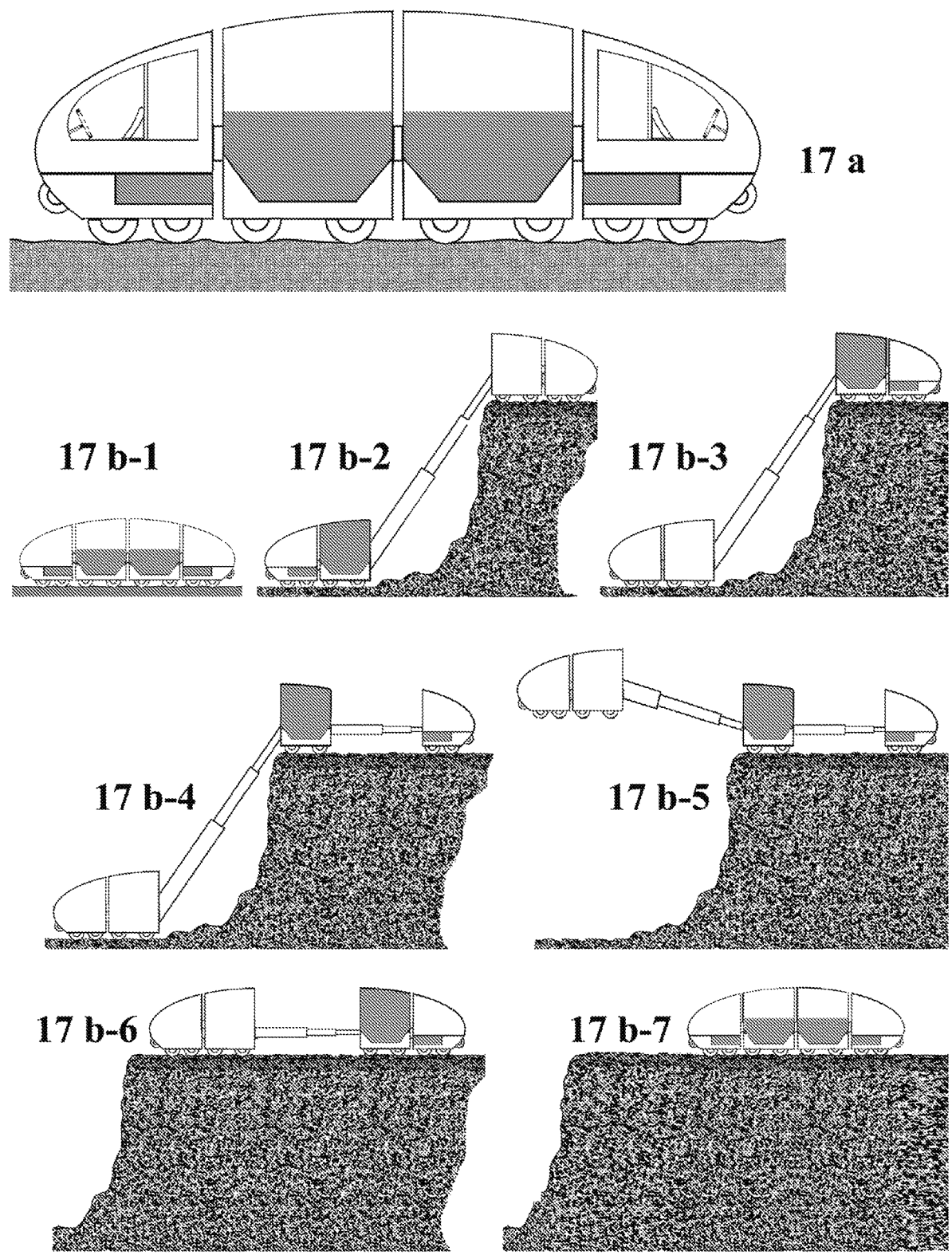
FIG. 17 shows a simplified schematic illustrating as an example a self-ascending hybrid manned-robotic mobile apparatus.

FIG. 17 shows a simplified schematic illustrating as an example a self-ascending hybrid manned-robotic mobile apparatus (the exterior appearance). Said hybrid manned-robotic mobile apparatus consists of four connected cars, including two end vehicles with semi-independent power drives and two wheeled tanks with liquid loads as well as additional smaller tanks underneath of the cabins. The cars are connected with telescopic hydraulic cylinders known by the prior art (for visibility, the telescopic cylinder is simplified on FIG. 17 *b*). The power drives, the main frames of cars and telescopic cylinder are made of ultra-light alloys, the remaining components of the system, including the bodies of cabins and tanks are made of plastic. The hybrid manned-robotic mobile apparatus comprises an internal control system providing it with ability for autonomous motion, two semi-independent power drives and correspondingly two cabins with conventional wheels for human driver. Each cabins may also carry passengers.

FIG. 17 *a* shows said self-ascending hybrid manned-robotic mobile apparatus in the process of automotive transportation upon a flat terrain. FIGS. 17 *b*-1-17 *b*-7 schematically show the self-ascending hybrid manned-robotic mobiles in the process of automotive mountaineering.

The Reconfigurable Bio-Like Robotic Systems' Embodiments

Figure 18:
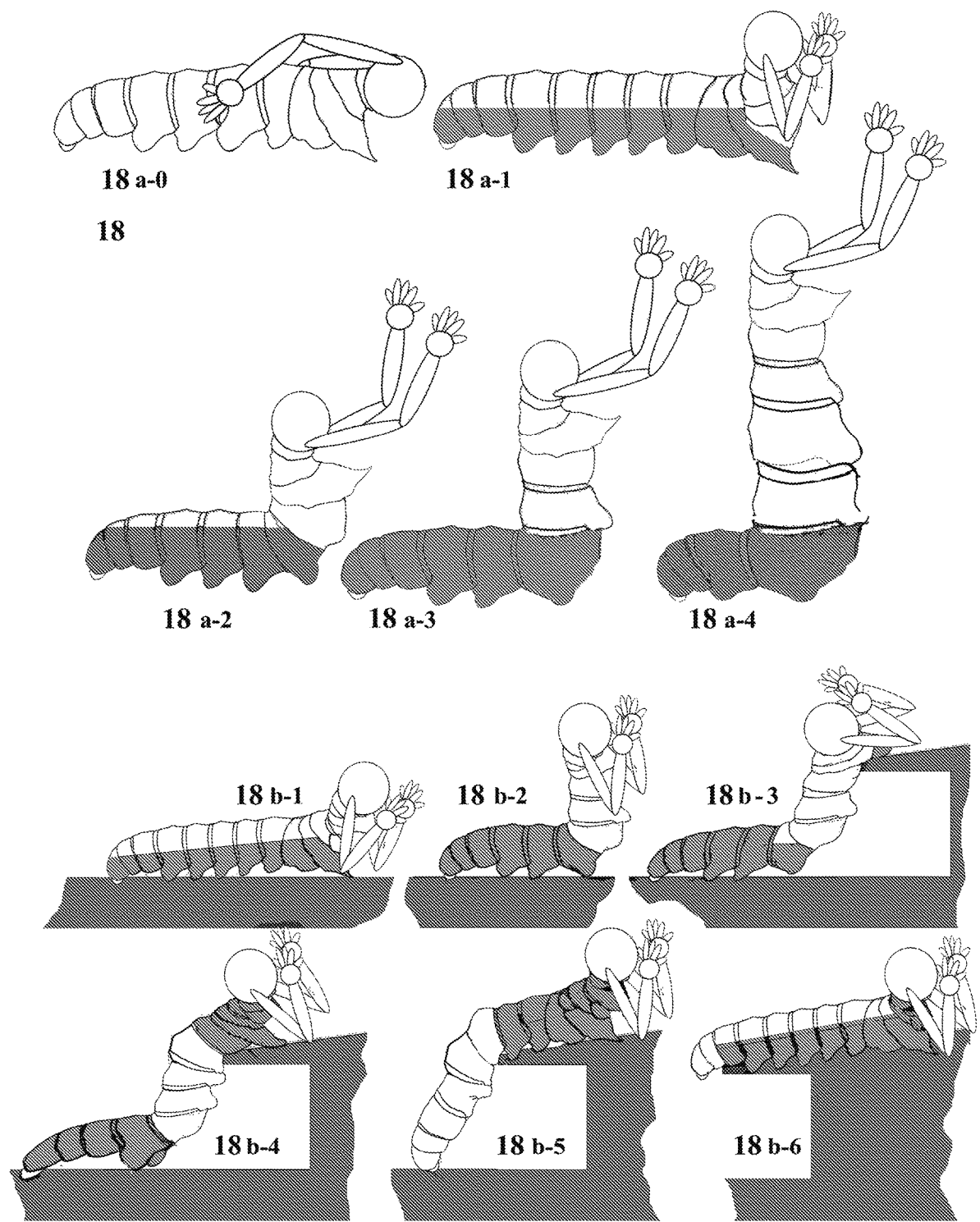
FIG. 18 shows a simplified schematic illustrating as an example caterpillar-like robotic system transforming between various bio-like arrangements practically and beneficially actualizing real and imaginative bio-forms, such as centaurs.

FIG. 18 shows a simplified schematic illustrating as an example caterpillar-like Sylphon-based robotic system transforming between various bio-like arrangements practically and beneficially actualizing real and imaginative bio-forms, such as centaurs. Specifically, FIG. 18 a shows such bio-like sylphon-based robotic system self-converting from the caterpillar-like to centaur-like functional state, wherein: FIG. 18 a-0—exterior appearance in the passive position during automotive transportation on uneven terrain, FIG. 18 a-1 is initial low functional position; grey-filled area shows the liquid level. FIGS. 18 a-2-18 a-4 show high functional positions of robotic system; the maximal achievable height of such position depends on the nature of the liquid load, specifically: FIG. 18 a-2 shows the maximal achievable height for system loaded with water, FIG. 18 a-3—high functional position of robotic system loaded with bromoform, FIG. 18 a-4—high functional position of robotic system loaded with mercury. FIGS. 18 b-1-18 b-6 show the sequent steps of a bio-like sylphon-based robotic system self-converting from the caterpillar-like to centaur-like functional state in the process of stepwise ascending.

Figure 19:
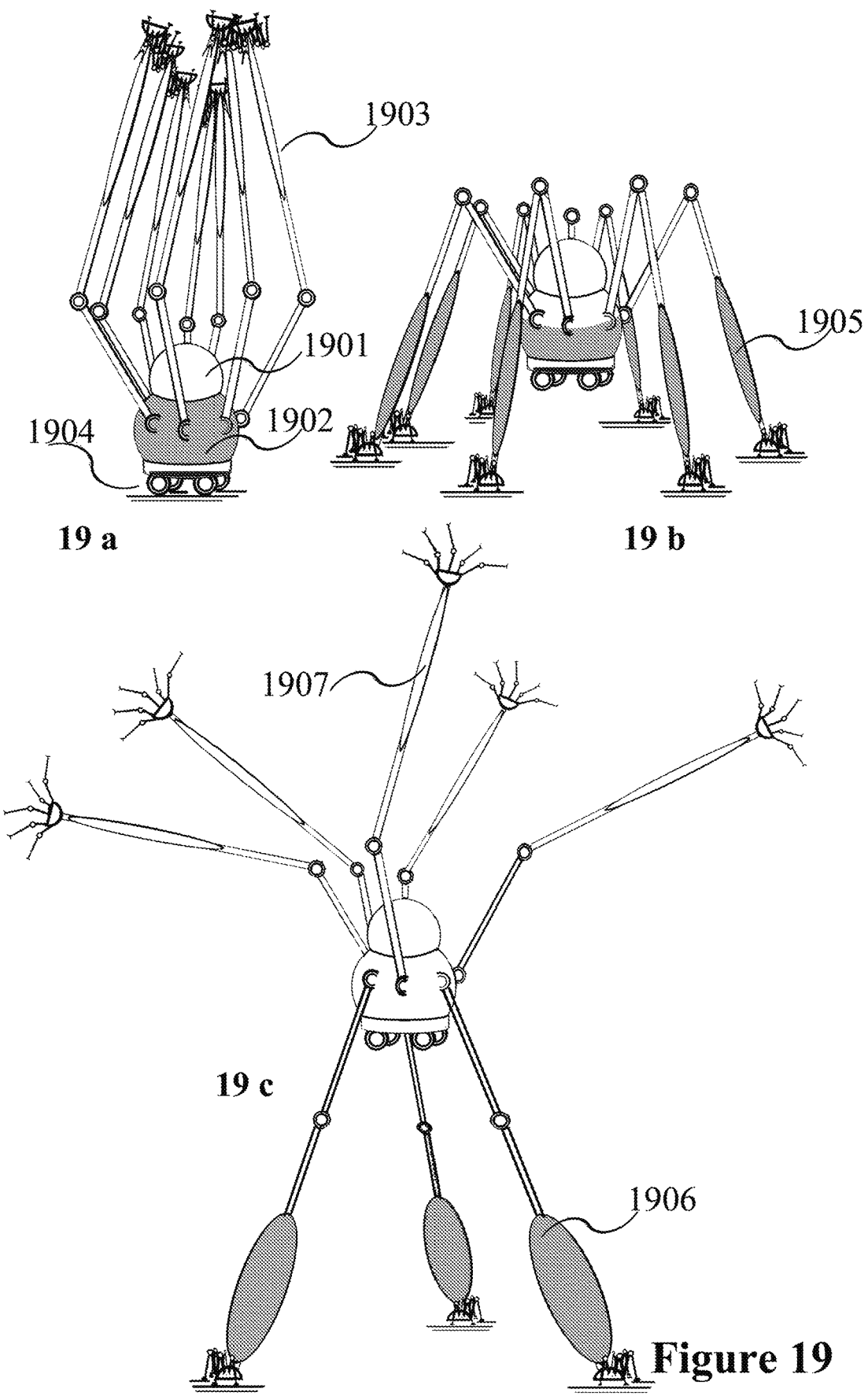
FIG. 19 shows Spider-like reconfigurable locomotion robotic system with broadly variable mass distribution and position of center of mass.

FIG. 19 shows Spider-like reconfigurable locomotion robotic system with broadly variable mass distribution and position of center of mass: 1901—head with the central control system; 1902—central rigid reservoir; 1903—extremities in completely deflated state; 1904—wheels; 1905—extremities in slightly inflated and partially filled with liquid load state; 1906—extremities as the supporting feet in completely inflated and fully filled with liquid load state; 1907—extremities as the working hands in completely deflated and emptied from liquid load state. The gray filling shows liquid load; for visibility purpose, the volumes of reservoirs shown out of comparative scale. FIG. 19 a shows Spider-like reconfigurable locomotion robotic system in position of the wheeled self-transportation; FIG. 19 b shows this system in intermediate state; FIG. 19 c shows Spider-like reconfigurable locomotion robotic system in a stationary position with multiple working hands.

Although the primary goal of this invention is providing technical means preventing risk for human lives and health in the harsh environment and challenging task, the relatively small or miniature models of the disclosed apparatuses may be employed as the children toys and for various entertainments including competitive games for people of various ages.

Applications of the disclosed methods and apparatuses can be realized in life-threatening circumstances, including natural and man-made disasters and battle fields. Application of the disclosed methods and apparatuses can be realized in circumstances demanding strong requirements for reliability and smoothness of the robot motion, including in a medical hospital, such as field hospitals. Applications of disclosed methods and apparatuses can be realized in an environment and under work conditions implying risk for human life or health, such as mining, chemical factories, and nuclear power stations. Applications of relatively small or miniature models of the disclosed apparatuses can be realized in the form of children's toys and entertainments. All provided specific embodiments, examples and illustrations in this patent disclosure should be considered as explanatory illustrations that neither limit nor exhaust the possible implementations of present invention in the entire scope of its claims.

The invention claimed is:

1. A locomotion robot, comprising:
   a liquid counterweight,
   at least two cars each including a tank for said liquid counterweight and a liquid pump,
   each of said tanks being connected by a flexible pipe for transfer of said liquid counterweight,
   said liquid counterweight being transported and reversibly redistributed between corresponding chambers of said tanks,
   each of said two cars including a motor or engine,
   each of said at least two cars having double flexible joints allowing said two cars to alternatively lift each other over a ground surface and mutually change their relative altitudinal positions,
   one of said double flexible joints having a telescopic hydraulic cylinder fixed with its base on a first of said two cars and with its opposite end of a sliding rod being fixed on a second of said two cars,
   another of said double flexible joints having a hoister installed on a second of said two cars and with an end of a cable of said hoister being fixed on said first of said two cars,
   said liquid counterweight being transferred to and amassed in said tank in said first of said two cars resting on the ground surface while emptying said tank in said second car of said two cars,
   said second car with an emptied tank being lifted by said telescopic hydraulic cylinder up to or slightly above the ground surface at an elevated terrain,
   the first moving moves a robotic system to a position thereby allowing the second car to be grounded on said elevated terrain,
   the second car being grounded on said elevated terrain by said telescopic hydraulic cylinder,
   said liquid counterweight being transferred to and amassed in said tank of the second of said two cars resting on said ground surface on said elevated terrain while emptying said tank in said first car of said two cars,
   the first car with an emptied tank being lifted by said hoister up to or slightly above of the ground of said elevated terrain,
   said second car moving the robotic system to a position allowing the first car to be grounded on said elevated terrain,
   said first car being grounded on said elevated terrain by said hoister such that the robotic system is self-ascended upon said elevated terrain.

2. The locomotion robot according to claim 1,
   wherein said locomotion robot ascends vertical barriers exceeding a normal height of said robot as measured during its resting position or movement on an even terrain.

* * * * *